(12) United States Patent
Nambara

(10) Patent No.: US 11,397,321 B2
(45) Date of Patent: Jul. 26, 2022

(54) HEAD-UP DISPLAY DEVICE AND IMAGE PROJECTION UNIT

(71) Applicant: DENSO CORPORATION, Kariya (JP)

(72) Inventor: Takahiro Nambara, Kariya (JP)

(73) Assignee: DENSO CORPORATION, Kariya (JP)

( * ) Notice: Subject to any disclaimer, the term of this patent is extended or adjusted under 35 U.S.C. 154(b) by 793 days.

(21) Appl. No.: 16/303,878

(22) PCT Filed: Apr. 12, 2017

(86) PCT No.: PCT/JP2017/014901
§ 371 (c)(1),
(2) Date: Nov. 21, 2018

(87) PCT Pub. No.: WO2017/203871
PCT Pub. Date: Nov. 30, 2017

(65) Prior Publication Data
US 2021/0278663 A1    Sep. 9, 2021

(30) Foreign Application Priority Data

May 25, 2016  (JP) .............................. JP2016-104630
Feb. 17, 2017  (JP) .............................. JP2017-028147

(51) Int. Cl.
*G02B 27/01* (2006.01)
*B60K 35/00* (2006.01)

(52) U.S. Cl.
CPC .......... *G02B 27/0101* (2013.01); *B60K 35/00* (2013.01); *B60K 2370/1529* (2019.05); *G02B 2027/013* (2013.01)

(58) Field of Classification Search
CPC ........ G02B 27/0101; G02B 2027/0123; B60K 35/00; B60K 2370/1529
See application file for complete search history.

(56) References Cited

U.S. PATENT DOCUMENTS

| | | |
|---|---|---|
| 2007/0064174 A1 | 3/2007 | Kitamura et al. |
| 2007/0086769 A1 | 4/2007 | Watanabe et al. |
| 2016/0147061 A1 | 5/2016 | Nambara |
| 2016/0282617 A1 | 9/2016 | Asai |

(Continued)

FOREIGN PATENT DOCUMENTS

| | | |
|---|---|---|
| CN | 1949073 A | 4/2007 |
| CN | 101819310 A | 9/2010 |

(Continued)

*Primary Examiner* — Ryan D Howard
(74) *Attorney, Agent, or Firm* — Harness, Dickey & Pierce, P.L.C.

(57) ABSTRACT

A head-up display device includes a light emitting device array, an image formation unit, and an optical member. The light emitting device array includes multiple light emitting devices to emit illumination light and arrayed in a device array direction. The image formation unit forms an image according to illumination of an illumination light and emits the image as a display light. The optical member includes a diverging unit located in an optical path between the light emitting device array and the image formation unit and exerts a diverging action in the device array direction on the illumination light. The diverging unit includes one or more refractive surfaces to refract the illumination light while exerting a diverging action.

14 Claims, 14 Drawing Sheets

(56) References Cited

U.S. PATENT DOCUMENTS

2016/0334075 A1 11/2016 Nambara
2017/0276936 A1* 9/2017 Shihaku ............. G02B 27/0101
2017/0329133 A1 11/2017 Nambara

FOREIGN PATENT DOCUMENTS

| | | |
|---|---|---|
| JP | 2009169399 A | 7/2009 |
| JP | 2010211065 A | 9/2010 |
| JP | 2011-093454 A | 5/2011 |
| JP | 2015004825 A | 1/2015 |
| JP | 2015133304 A | 7/2015 |
| JP | 2015232943 A | 12/2015 |
| JP | 2016-045244 A | 4/2016 |
| JP | 2017009864 A | 1/2017 |
| WO | WO-2016092724 A1 | 6/2016 |

* cited by examiner

HEAD-UP DISPLAY DEVICE AND IMAGE PROJECTION UNIT

CROSS REFERENCE TO RELATED APPLICATIONS

This application is a U.S. National Phase Application under 35 U.S.C. 371 of International Application No. PCT/JP2017/014901 filed on Apr. 12, 2017. This application is based on and claims the benefit of priority from Japanese Patent Applications No. 2016-104630 filed on May 25, 2016 and No. 2017-028147 filed on Feb. 17, 2017. The entire disclosures of all of the above applications are incorporated herein by reference.

TECHNICAL FIELD

The present disclosure relates to a head-up display device (hereinafter abbreviated to HUD device) configured to be mounted on a movable object and to display a virtual image to be visually recognized by an occupant.

BACKGROUND ART

Conventionally, an HUD device, which is mounted on a movable object and displays a virtual image to be visually recognizable by an occupant, has been known. The HUD device disclosed in Patent Literature 1 includes a light emitting device array and an image formation unit. In the light emitting device array, multiple light emitting devices that emit illumination light are arrayed in a device array direction. The image formation unit forms an image according to illumination of an illumination light and emits the formed image as a display light.

In addition, the HUD device includes two lens arrays that are arrayed according to the device array direction and condense the illumination light. An array pitch of the light emitting devices is set to be smaller than an array pitch of lens surfaces in the two lens arrays. The light emitting devices and apexes of lens surfaces corresponding to the light emitting devices are arranged on a straight line. In other words, attempt is made to reduce luminance unevenness of a virtual image when an occupant moves his head by using eccentricity toward a center side of the light emitting devices with respect to the two lens arrays.

However, due to the eccentricity of the multiple light emitting devices to the center side, a light quantity of the display light reflected by a projection member is concentrated in a narrow range, and the display light does not reach a wide range. As a result, for example, when the occupant moves his head more greatly, the luminance of the virtual image sharply decreases. For that reason, there is room for improvement in the visibility of the virtual image.

PRIOR TECHNICAL LITERATURE

Patent Literature

PATENT LITERATURE 1: JP 2015-232943 A

SUMMARY OF INVENTION

The present disclosure aims at providing an HUD device with high visibility of a virtual image.

According to one aspect of the present disclosure, a head-up display device is configured to be mounted on a movable object. The head-up display device is configured to project a display light of an image on a projection member and to cause the projection member to reflect the display light to display a virtual image of the image to be visually recognizable by an occupant. The head-up display device comprises a light emitting device array including a plurality of light emitting devices configured to emit illumination light and arrayed in a plurality of device array directions. The head-up display device further comprises an image formation unit configured to form the image according to illumination caused by the illumination light and to emit the image as the display light. The head-up display device further comprises an optical member including a diverging unit, which is located in an optical path between the light emitting device array and the image formation unit, and configured to exert a diverging action in at least one specific direction among the plurality of device array directions on the illumination light from the respective light emitting devices. The diverging unit includes one or more refractive surfaces configured to refract the illumination light while exerting the diverging action.

According to one aspect of the present disclosure, a head-up display device is configured to be mounted on a movable object. The head-up display device is configured to project a display light of an image on a projection member and to cause the projection member to reflect the display light to display a virtual image of the image to be visually recognizable by an occupant. The head-up display device comprises a light emitting device array including a plurality of light emitting devices configured to emit illumination light and arrayed in a device array direction. The head-up display device further comprises an image formation unit configured to form the image according to illumination caused by the illumination light and to emit the image as the display light. The head-up display device further comprises an optical member including a diverging unit, which is located in an optical path between the light emitting device array and the image formation unit, and configured to exert a diverging action in the device array direction on the illumination light from the respective light emitting devices. The diverging unit includes one or more refractive surfaces configured to refract the illumination light. The one or more refractive surfaces have one main axis in a cross section including the device array direction.

According to one aspect of the present disclosure, an image projection unit is for a head-up display device configured to be mounted on a movable object. The head-up display device is configured to project a display light of an image on a projection member and to cause the projection member to reflect the display light to display a virtual image of the image to be visually recognizable by an occupant. The image projection unit comprises a light emitting device array including a plurality of light emitting devices configured to emit illumination light and arrayed in a plurality of device array directions. The image projection unit further comprises an image formation unit configured to form the image according to illumination caused by the illumination light and to emit the image as the display light. The image projection unit further comprises an optical member including a diverging unit located in an optical path between the light emitting device array and the image formation unit and configured to exert a diverging action in at least one specific direction among the plurality of device array directions on the illumination light from the respective light emitting devices. The diverging unit includes one or more refractive surfaces configured to refract the illumination light while exerting the diverging action.

According to one aspect of the present disclosure, an image projection unit is for a head-up display device configured to be mounted on a movable object. The head-up display device is configured to project a display light of an image on a projection member and to cause the projection member to reflect the display light to display a virtual image of the image to be visually recognizable by an occupant. The image projection unit comprises a light emitting device array including a plurality of light emitting devices configured to emit illumination light and arrayed in a device array direction. The image projection unit further comprises an image formation unit configured to form the image according to illumination caused by the illumination light and to emit the image as the display light. The image projection unit further comprises an optical member including a diverging unit located in an optical path between the light emitting device array and the image formation unit and configured to exert a diverging action in the device array direction on the illumination light from the respective light emitting devices. The diverging unit includes one or more refractive surfaces configured to refract the illumination light.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Hereinafter, description will be given of the multiple embodiments of the present disclosure based on the drawings. Corresponding constituent elements in each embodiment are given the same signs, and there are cases in which duplicated explanation is omitted. In a case in which only a portion of the configuration in each embodiment is described, the configuration of another embodiment which is described earlier may be applied for the other portions of the configuration. In addition, configurations specified in the description of each embodiment can be combined, and especially, configurations of the plurality of embodiments can be partially combined even though not specified herein so long as no problem occurs in the combination thereof.

First Embodiment

Figure 1:
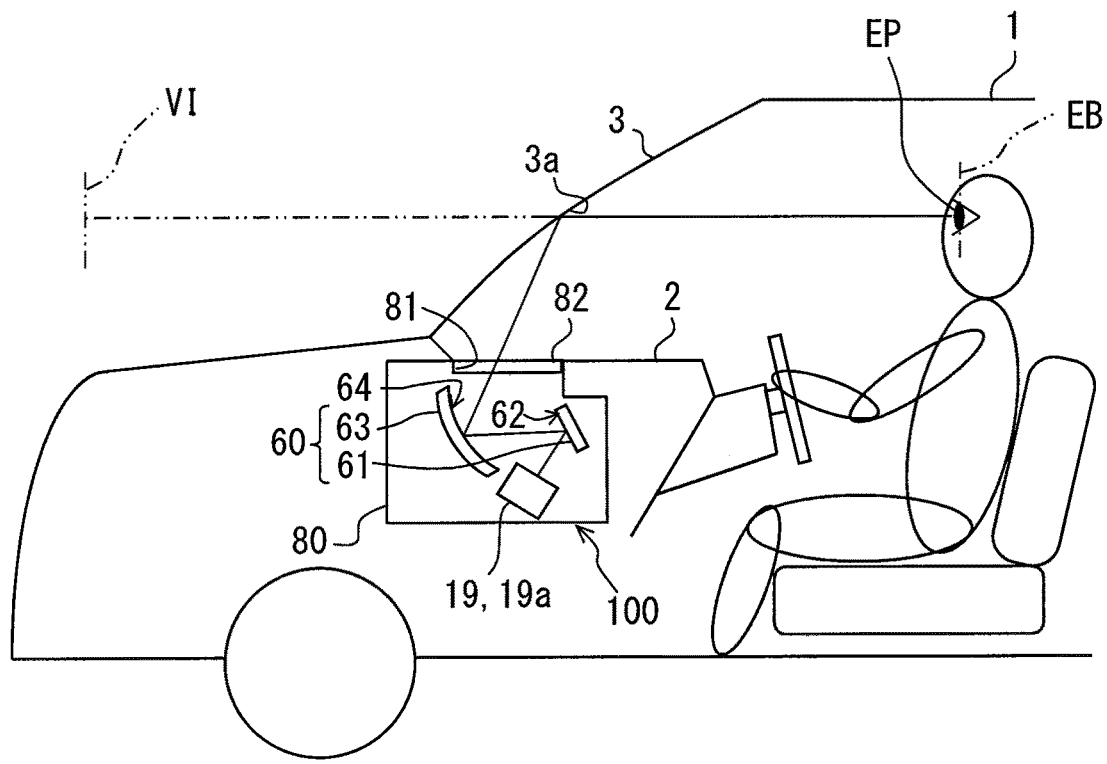
FIG. 1 is a schematic diagram illustrating an installed state of an HUD device in a vehicle according to a first embodiment.

As illustrated in FIG. 1, an HUD device 100 according to a first embodiment of the present disclosure is installed in a vehicle 1 that is one type of a movable object, and is housed in an instrument panel 2. The HUD device 100 projects display light of an image onto a windshield 3 which serves as a projection member of the vehicle 1. With the above configuration, the HUD device 100 virtually displays an image in such a manner as to be visible to an occupant in the vehicle 1. In other words, the display light reflected by the windshield 3 reaches a visible region EB set in an interior of the vehicle 1, as a result of which an occupant whose eye point EP is positioned within the visible region EB perceives the display light as a virtual image VI. The occupant is capable of recognizing various pieces of information which are displayed as the virtual image VI. Examples of various pieces of information which is displayed as the virtual image VI include vehicle state values such as vehicle speed and remaining fuel level, or vehicle information such as road information and visibility auxiliary information.

The windshield 3 of the vehicle 1 is formed in a plate-shape and made of a light transmissive glass or a synthetic resin. In the windshield 3, a projection surface 3a onto which the display light is projected is formed into a smooth concave surface shape or a flat surface shape. As the projection member, instead of the windshield 3, a combiner that is separate from the vehicle 1 may be installed inside the vehicle 1, and the image may be projected onto the combiner. Further, the HUD device 100 per se may include a combiner as a projection member.

The visible region EB is a space region in which the virtual image VI displayed by the HUD device 100 is visible. In other words, if the eye point EP falls within the visible region EB, the virtual image VI can be visually recognized, and if the eye point EP deviates from the visible region EB, visibility of the virtual image VI becomes extremely difficult.

A specific configuration of the HUD device 100 described above will be described below with reference to FIGS. 2 to 9. The HUD device 100 includes a light emitting device array 10, a condenser lens 20, a diverging lens 30, a projection lens 40, an image display panel 50, and a light guide portion 60. Those components are housed and held in a housing 80.

Figure 2:
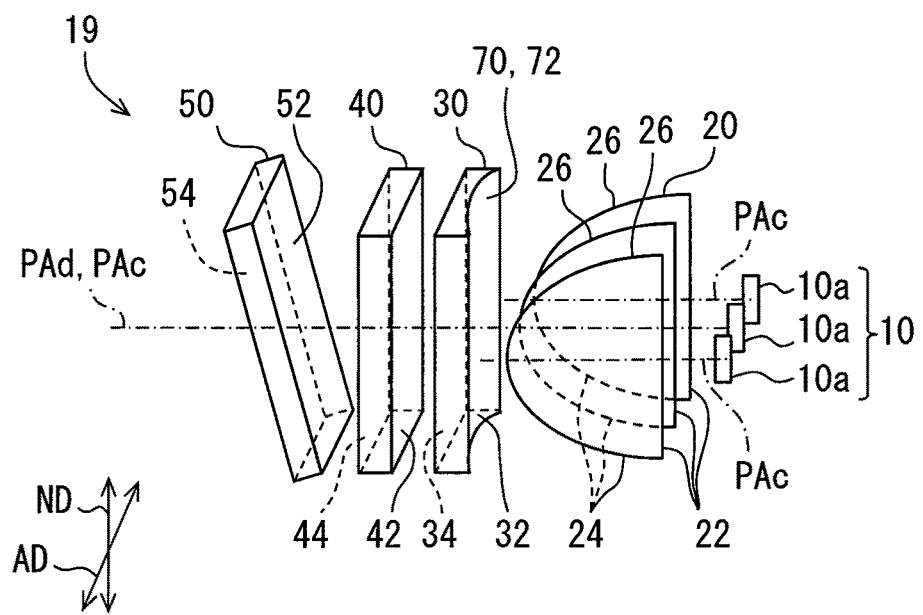
FIG. 2 is a perspective view schematically showing an image projection unit according to the first embodiment.

In this example, as shown in FIG. 2, an image projection unit 19 is configured by the light emitting device array 10, the condenser lens 20, the diverging lens 30, the projection lens 40, and the image display panel 50. The respective members 10, 20, 30, and 40 of the image projection unit 19 are housed in a casing 19a (refer to FIG. 1) having a light shielding property.

Figure 3:
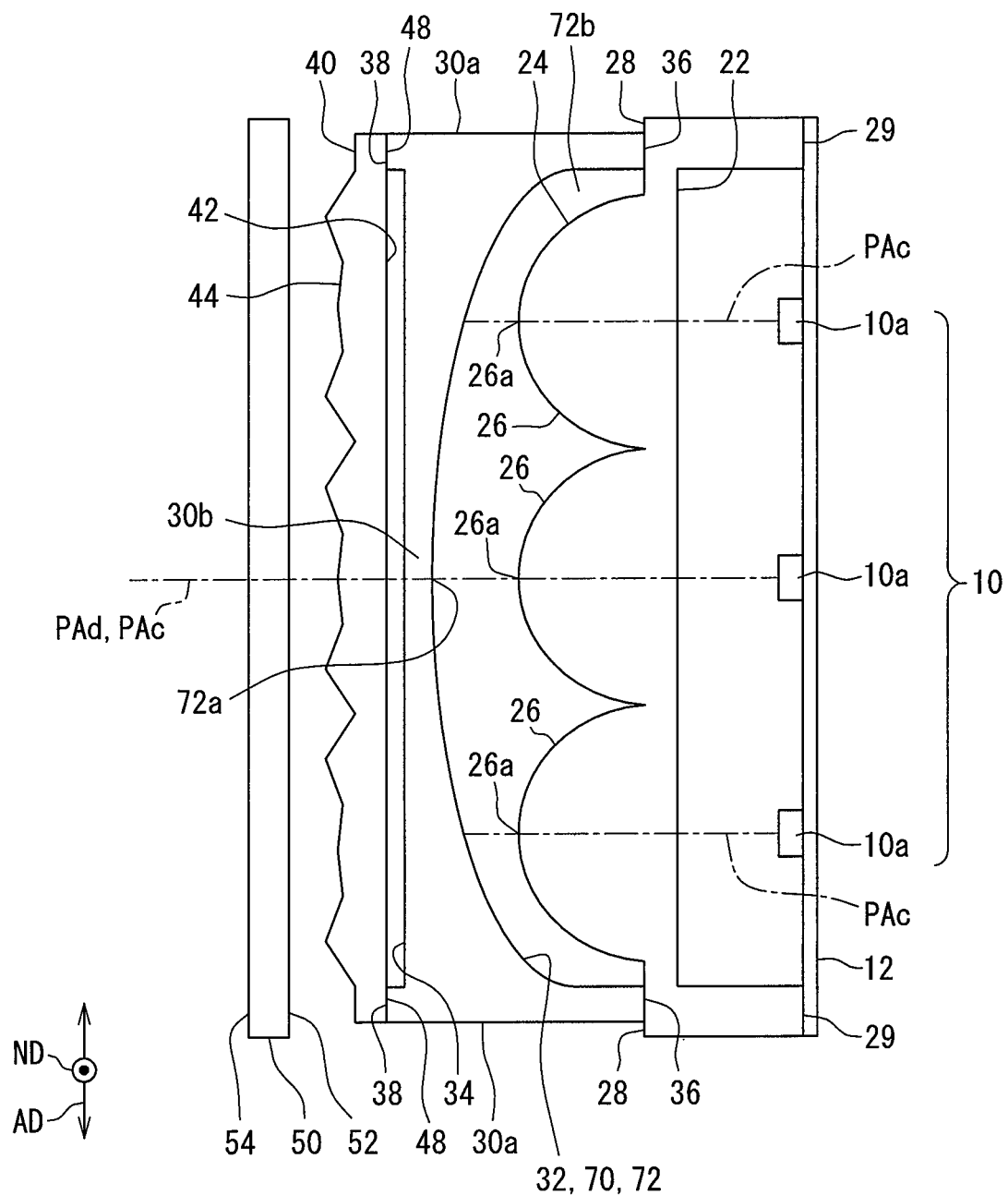
FIG. 3 is a diagram schematically showing a cross section of the image projection unit including a device array direction according to the first embodiment.

As shown in FIGS. 2 and 3, the light emitting device array 10 has multiple light emitting devices 10a. The multiple light emitting devices 10a are mounted on a light source circuit board 12 formed in a plate-like shape and are arrayed in a device array direction AD with predetermined spaces between the respective light emitting devices 10a. In the present embodiment, the device array direction AD is one direction, and three light emitting devices 10a are provided along the light emitting device array 10.

Each of the light emitting devices 10a is, for example, a light emitting diode device with little heat generation. The respective light emitting devices 10a are electrically connected to a power supply through a wiring pattern on a light source circuit board 12. In more detail, each of the light emitting devices 10a is formed by sealing a chip-shaped blue light emitting diode device with a yellow phosphor in which a light transmissive synthetic resin is mixed with a yellow fluorescent agent. The yellow phosphor is excited by the blue light emitted according to a current amount from the blue light emitting diode device to emit a yellow light, and illumination light of pseudo white is emitted from the respective light emitting devices 10a by mixture of the blue light with the yellow light.

Figure 4:
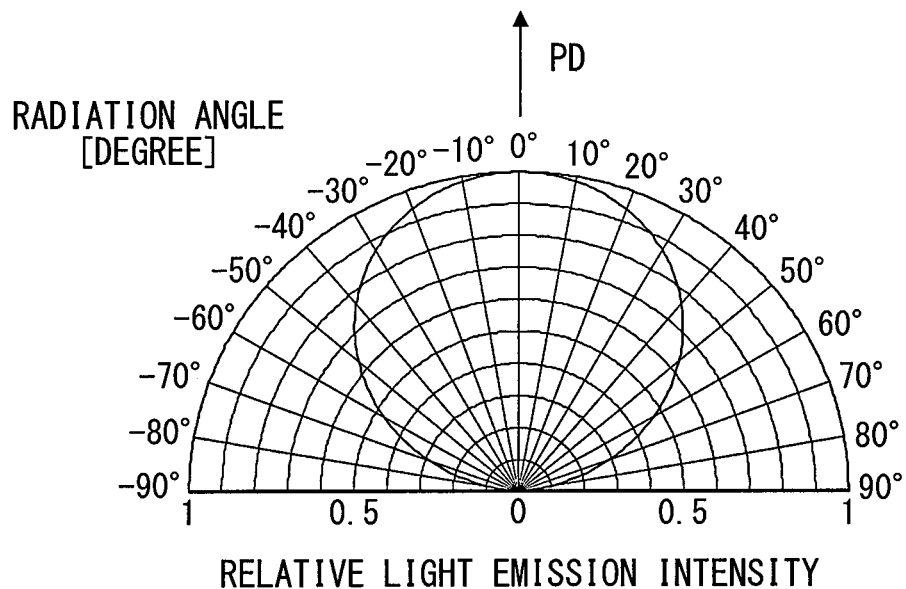
FIG. 4 is a graph illustrating a radiation angle distribution of light emitting devices according to the first embodiment.

In this example, as illustrated in FIG. 4, each of the light emitting devices 10a emits the illumination light with a radiation angle distribution in which the light emission intensity relatively decreases as the light emission intensity deviates from a light emission peak direction PD where the light emission intensity becomes maximum. In particular, in the present embodiment, the light emission peak direction PD of the respective light emitting devices 10a are aligned in a direction perpendicular to a plate surface of the light source circuit board 12. Such illumination light enters the condenser lens 20.

As shown in FIGS. 2 and 3, the condenser lens 20 is located in an optical path between the light emitting device array 10 and the image display panel 50, more particularly in the optical path between the light emitting device array 10 and the diverging lens 30. The condenser lens 20 is configured by a lens array made of a light transmissive synthetic resin or glass, or the like.

In the condenser lens 20, an incident side surface 22 that faces the light emitting device array 10 has a smooth planar shape common to the whole condenser lens 20. On the other hand, multiple condensing convex surfaces 26 are arrayed on an emission side surface 24 that faces the diverging lens 30 in the condenser lens 20.

The condensing convex surfaces 26 are provided so as to be paired with the respective light emitting devices 10a, individually. Specifically, the condensing convex surfaces 26 are provided in the same number (for example, three) as that of the light emitting devices 10a according to the array number of the light emitting devices 10a, and arrayed in alignment with the device array direction AD as with the light emitting devices 10a.

Each of the condensing convex surfaces 26 is curved in a convex shape at least in the device array direction AD so as to be formed in a smooth convex shape. In particular, in the present embodiment, each condensing convex surface 26 is formed in a spherical shape. The respective condensing convex surfaces 26 have substantially the same shape as each other.

As a result, each condensing convex surface 26 configures a main axis PAc corresponding to the paired light emitting device 10a, individually. In this example, the main axis in the present embodiment means a virtual axis that connects a surface vertex and the center of curvature (for example, the center of curvature defined by the surface vertex). In particular, in the present embodiment, the main axis PAc of each condensing convex surface 26 passes through the paired light emitting device 10a and extends in a direction substantially coincident with a light emission peak direction PD. In this way, the condenser lens 20 configures the multiple (for example, three) main axes PAc having the same number as that of the light emitting devices 10a or the light condensing convex surfaces 26 in a cross section including the device array direction AD.

In this way, the illumination light from each light emitting device 10a is mainly incident on the paired condensing convex surface 26 and is refracted, thereby being subjected to the individual condensing action for each condensing convex surface 26. The illumination light subjected to the individual condensing action and emitting from the condenser lens 20 is incident to the diverging lens 30.

In addition, more particularly, as shown in FIG. 3, abutment receiving portions 28 formed in a planar shape are provided on an outer periphery of the array of the condensing convex surfaces 26 on the emission side surfaces 24 of the condenser lenses 20. The abutment receiving portions 28 contact first abutment portions 36 of the diverging lens 30 which will be described later. Board abutment portions 29 that project from the incident side surface 22 toward the light source circuit board 12 and contact the light source circuit board 12 are provided on the side of the light emitting device array 10 on the outer periphery of the array of the condensing convex surfaces 26.

As shown in FIGS. 2 and 3, the diverging lens 30 is located in an optical path between the light emitting device array 10 and the image display panel 50, more particularly in the optical path between the condenser lens 20 and the projection lens 40. The diverging lens 30 is made of a light transmissive synthetic resin or glass or the like.

In the diverging lens 30, an emission side surface 34 that faces the projection lens 40 has a smooth planar shape common to the entire divergent lens 30. On the other hand, in the diverging lens 30, a diverging unit 70 is provided on the incident side surface 32 that faces the condenser lens 20.

The diverging unit 70 has a single refractive surface 72 as a surface for refracting the illumination light. The refractive surface 72 is curved in a concave shape at least in the device array direction AD so as to be formed in a smooth concave shape. In particular, in the present embodiment, the refractive surface 72 has a curvature in the device array direction AD, but has substantially no curvature in an array orthogonal direction ND orthogonal to the device array direction AD so that the refractive surface 72 is formed in a cylindrical surface shape.

A diameter of the refractive surface 72 in the device array direction AD is larger than a sum of the diameters of the respective condensing convex surfaces 26. The refractive surface 72 is a single surface that collectively refracts the illumination light incident from the respective light emitting devices 10a through the paired condenser lenses 20. In other words, the illumination light that has passed through the respective condensing convex surfaces 26 is refracted by the single refractive surface 72 that faces the respective condensing convex surfaces 26.

The refractive surface 72 configures one main axis PAd passing through the surface vertex 72a in a cross section including the device array direction AD (for example, a meridional section including the device array direction AD). More particularly, in the present embodiment, since odd number of the light emitting devices 10a are provided, the main axis PAd of the diverging unit 70 passes through the light emitting device 10a and a surface vertex 26a of the condensing convex surface 26 at a center pair of the pairs of the light emitting devices 10a and the condensing convex surfaces 26 arrayed in the device array direction AD. In other words, one main axis PAd of the diverging unit 70 overlaps with the central main axis PAc of the multiple main axes PAc of the condensing convex surfaces 26. Meanwhile, in the present embodiment, since the main axis PAd substantially coincides with the optical axis, terms of paraxial and off-axis are handled with reference to the main axis PAd.

In this manner, the illumination light from the respective light emitting devices 10a is diverged in the device array direction AD by the single refractive surface 72 common to the respective light emitting devices 10a after passing through the respective condensing convex surfaces 26. The illumination light subjected to the diverging action and emitted from the diverging lens 30 is incident on the projection lens 40.

The diverging lens 30 is formed in a plano-concave lens shape as a whole by the shapes of the surfaces 32 and 34 described above. In other words, a thickness of the diverging lens 30 gradually increases from the main axis PAd toward the outside of the axis on both sides in the device array direction AD. In this manner, a thickness of outer edge portions 30a outside the axis of the diverging lens 30 on both sides in the device array direction AD is larger than a thickness in a paraxial portion 30b. As shown in FIG. 3, the diverging lens 30 is shaped such that the outer edge portions 30a protrudes toward the light emitting device array 10 from the paraxial portion 30b by the single concave refractive surface 72 and tips of the projecting outer edge portions 30a are chamfered in a planar shape on the side of the light emitting device array 10. The tips of the outer edge portions 30a are in contact with the abutment receiving portions 28 of the condenser lenses 20 so that the diverging lens 30 has the first abutment portions 36 of the outer edge portions 30a which are in contact with the condenser lenses 20 on the side of the light emitting device array 10.

In connection with the fact that the first abutment portions 36 of the diverging lens 30 and the abutment receiving portions 28 of the condenser lenses 20 are in contact with each other, at least a part of the respective condensing convex surfaces 26 that project toward the refractive surface 72 side from the abutment receiving portion 28 is located in a space 72b caused by a concave curvature of the refractive surface 72. In FIG. 2, as a result of schematically showing the image projection unit 19, it seems that the condensing convex surfaces 26 are not located in the space 72b, but actually are located as shown in FIG. 3.

On the other hand, on the image display panel 50 side of the outer edge portions 30a, the diverging lens 30 has second abutment portions 38 that are in contact with the projection lens 40. The second abutment portions 38 are provided as protrusions protruding from the emission side surface 34 toward the projection lens 40 at the outer edge portions 30a. Each second abutment portion 38 has the tip of the protrusion formed in a planar shape.

The projection lens 40 is located in the optical path between the light emitting device array 10 and the image display panel 50, particularly in the optical path between the diverging lens 30 and the image display panel 50. The projection lens 40 is made of a light transmissive synthetic resin or glass and has a substantially plate-like shape as a whole. The projection lens 40 is a lens array in which multiple divided blocks 40a are arrayed and formed integrally. In the present embodiment, the multiple divided blocks 40a are provided in the same number as that of the light emitting devices 10a or the condensing convex surfaces 26, and are array in alignment with the device array direction AD, as with the light emitting devices 10a and the condensing convex surfaces 26. In the present embodiment, the respective divided blocks 40a have substantially the same shape as each other.

Figure 5:
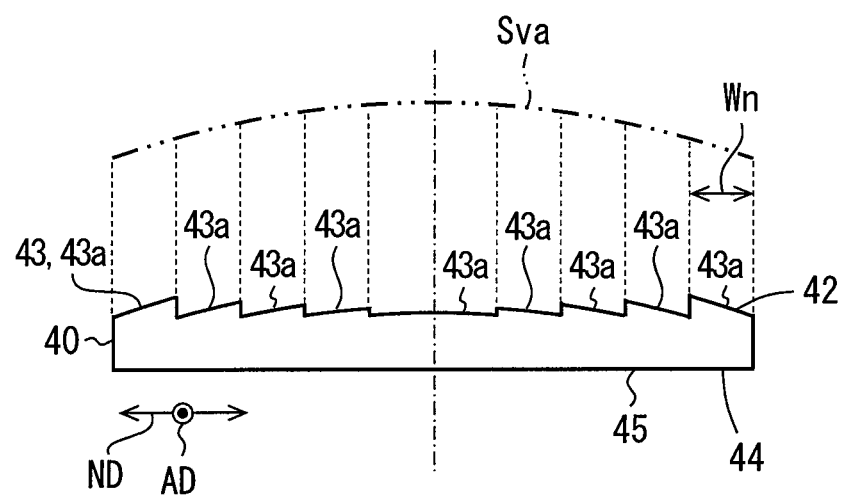
FIG. 5 is a diagram illustrating an incident side surface of a projection lens according to the first embodiment.

As shown in FIG. 5, multiple divided lens surfaces 43 are formed in a state of being divided into stripes on the incident side surface 42 of the projection lens 40 which faces the diverging lens 30. A dividing direction of the divided lens surfaces 43 on the incident side surface 42 is, for example, along the array orthogonal direction ND, and boundary lines between the adjacent divided lens surfaces 43 extend linearly along the device array direction AD. Therefore, in the cross section including the device array direction AD, one divided lens surface 43 is formed across the multiple divided blocks 40a. In this way, the respective divided lens surfaces 43 are formed as one divided region which is divided into regions with a predetermined division width Wn.

In the present embodiment, divided convex surfaces 43a divided into a convex Fresnel lens shape are provided as the divided lens surface 43. The divided convex surfaces 43a are formed based on one virtual convex curved surface Sva defined as a virtual lens surface in the projection lens 40. In this example, the virtual convex curved surface Sva has a smooth cylindrical surface shape which is curved into a convex shape convex toward the light emitting device array 10 side in the array orthogonal direction ND. Therefore, the incident side surface 42 mainly exerts a deflecting action for deflecting a traveling direction of the illumination light on the illumination light in the array orthogonal direction ND. More specifically, in the present embodiment, the deflecting action is a condensing action.

Figure 6:
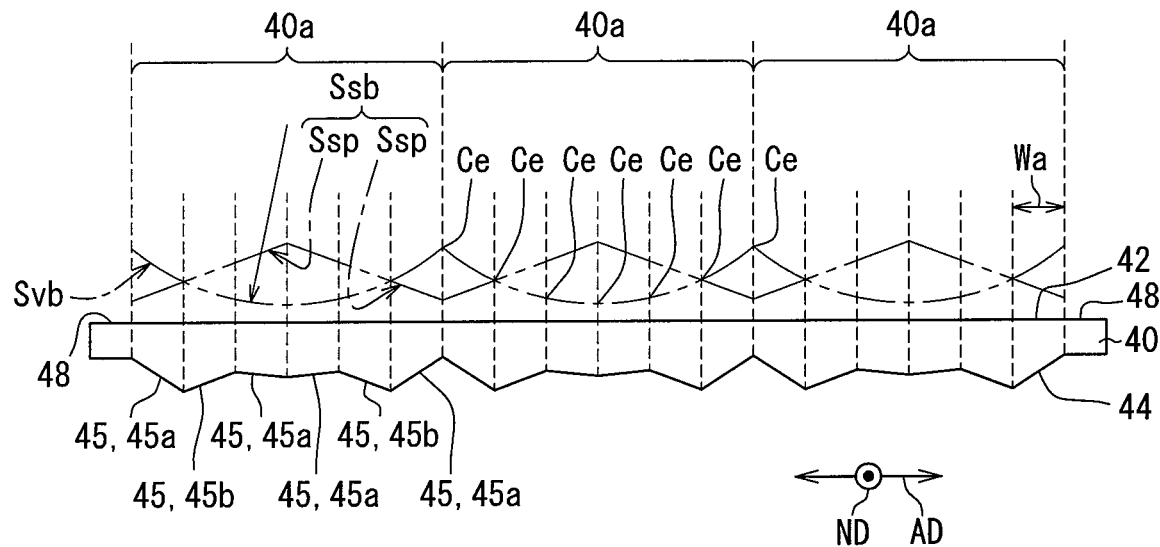
FIG. 6 is a diagram illustrating an emission side surface of the projection lens according to the first embodiment.

On the other hand, as shown in FIG. 6, multiple divided lens surfaces 45 are formed in a state of being divided into stripes on the emission side surface 44 of the projection lens 40 which faces the image display panel 50. A dividing direction of the divided lens surfaces 45 on the emission side surface 44 is along the device array direction AD, and boundary lines between the adjacent divided lens surfaces 45 extend linearly along the array orthogonal direction ND. In this way, the respective divided lens surfaces 45 are formed as one divided region which is divided into regions with a predetermined division width Wa.

In this example, when attention is focusing on one divided block 40a, multiple approximate planes 45a and multiple anisotropic deflection planes 45b are provided as the divided lens surfaces 45. The approximate planes 45a are formed based on a virtual convex curved surface Svb defined as a virtual lens surface in the projection lens 40. In this example, the virtual convex curved surface Svb has a smooth cylindrical surface shape which is curved into a convex shape convex toward the image display panel 50 side along the device array direction AD. The approximate plane 45a is formed in a planar shape as an approximate plane obtained by linear interpolation of multiple coordinates extracted from the virtual convex curved surface Svb. In particular, in the present embodiment, as the multiple coordinates, end coordinates Ce of the virtual convex curved surfaces Svb at end portions of the divided regions are adopted, and a gradient of the approximate plane is specified by linear interpolation between the end coordinates Ce. The virtual convex curved surface Svb appears on the emission side surface 44 in a state of being planar by partial approximation.

The anisotropic deflection planes 45b are interposed between the approximate planes 45a. The anisotropic deflection planes 45b are formed based on a virtual inclined surface Ssb defined as a virtual lens plane in the projection lens 40. The virtual inclined surface Ssb is configured by multiple planar inclined surfaces Ssp which change in inverse gradient in a cross section corresponding to a surface vertex of the virtual convex curved surface Svb in the section including the device array direction AD. The slope of each planar inclined surface Ssp is set to be a gradient in a direction opposite to the gradient of the corresponding portion of the virtual convex curved surface Svb. When a part of the virtual inclined surface Ssb is extracted, the anisotropic deflection plane 45b appears on the emission side surface 44.

More specifically, in the present embodiment, for example, six divided lens surfaces 45 are set for one divided block 40a. The six divided lens surfaces 45 are arrayed in the order of the approximate plane 45a, the anisotropic deflection plane 45b, the approximate plane 45a, the approximate plane 45a, the anisotropic deflection plane 45b, and the approximate plane 45a, and a boundary between the adjacent approximate planes 45a corresponds to a surface vertex of the virtual convex curved surface Svb. In FIG. 6, each reference numeral is attached to only a part of the corresponding element.

In this way, the emission side surface 44 mainly exerts the deflecting action for deflecting a traveling direction of the illumination light on the illumination light in the device array direction AD. Since the illumination light refracted at the approximate plane 45a is subjected to the deflecting action in the same direction as that of the condensing action of the ordinary convex surface as the deflection action, the deflecting action can be conceivable to be a substantial condensing action. The illumination light refracted by the anisotropic deflection plane 45b is subjected to the deflecting action in the opposite direction to the adjacent approximate plane 45a as deflecting action. The illumination light subjected to the deflecting action in the opposite direction in the anisotropic deflection plane 45b is mixed with the illumination light subjected to the deflection action on the approximate plane 45a.

In the projection lens 40 having such a complicated shape, it is difficult to prescribe one main axis, and there are substantially multiple axes. The illumination light thus emitted from the projection lens 40 is incident on the image display panel 50.

Further, as shown in FIG. 3, on the incident side surface 42 of the projection lens 40, abutment receiving portions 48 formed in a planar shape are formed on an outer periphery of the divided blocks 40a. The abutment receiving portions 48 are in contact with the second abutment portions 38 of the diverging lens 30.

As shown in FIGS. 2 and 3, the image display panel 50 is configured by a liquid crystal panel formed of a thin film transistor (TFT) and includes, for example, an active matrix liquid crystal panel formed of multiple liquid crystal pixels 50a that are arrayed two-dimensionally.

Figure 7:
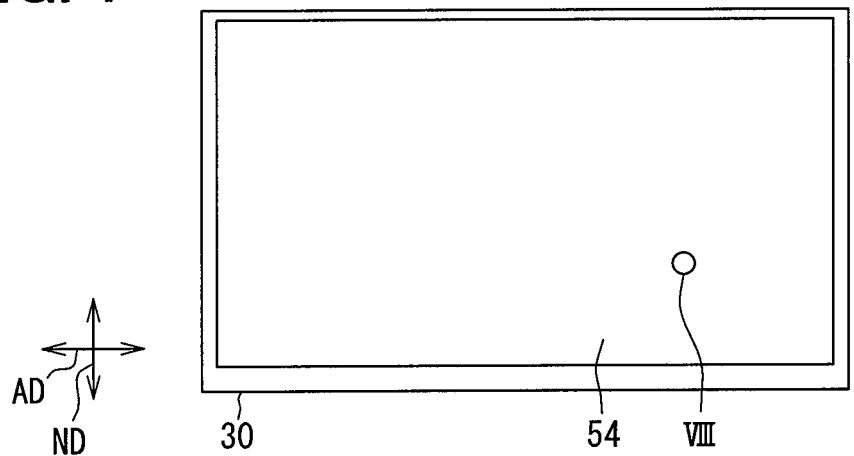
FIG. 7 is a diagram showing an image display panel as viewed along a normal line of a display surface according to the first embodiment.
Figure 8:
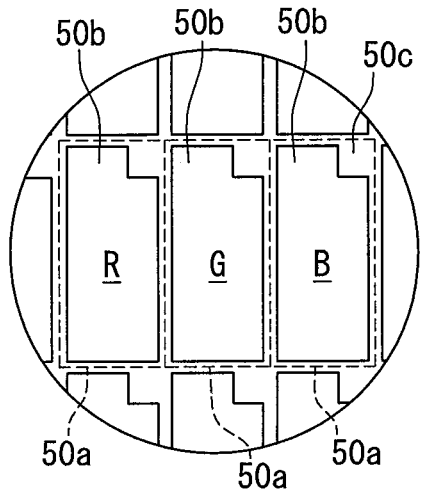
FIG. 8 is an enlarged view of a portion VIII of FIG. 7.

Specifically, as shown in FIG. 7, the image display panel 50 has a rectangular shape having a longitudinal direction and a short direction. In the present embodiment, the longitudinal direction is along the device array direction AD. As shown in FIG. 8, since the liquid crystal pixels 50a are arranged in the longitudinal direction and the short direction, a display surface 54 that emits an image as a display light on the light guide unit 60 side also has a rectangular shape. In each liquid crystal pixel 50a, a transmissive portion 50b penetrating through the display surface 54 in a normal direction and a wiring portion 50c formed so as to surround the transmissive portion 50b are provided.

Since the image display panel 50 is formed by laminating a pair of polarizing plates and a liquid crystal layer sandwiched between the pair of polarizing plates, the image display panel 50 has a plate-like shape. Each polarizing plate has a property of transmitting a light polarized in a predetermined direction and absorbing a light polarized in a direction perpendicular to the predetermined direction, and the pair of polarizing plates are located such that the predetermined directions are orthogonal to each other. The liquid crystal layer can rotate a polarization direction of the light incident on the liquid crystal layer according to an applied voltage by applying the voltage for each liquid crystal pixel. A ratio of the light transmitted through the later polarizing plate due to the rotation of the polarization direction, that is, a transmittance can be changed.

Therefore, the image display panel 50 controls the transmittance of each liquid crystal pixel 50a against the incidence of the illumination light on an illumination target surface 52 which is a surface on a light emitting device array 10 side. In other words, the image display panel 50 can form an image corresponding to the illumination by the illumination light and can emit the image as the display light. Color filters of mutually different colors (for example, red, green, and blue) are provided in adjacent liquid crystal pixels 50a, and various colors are realized by the combinations of those color filters.

In particular, as shown in FIG. 2, the image display panel 50 is inclined such as the normal direction of the display surface 54 intersects with the light emission peak direction PD immediately after emission from the light emitting device array 10, the directions of the main axes Pac and PAd, and a plate thickness direction of the projection lens 40. Since the display surface 54 of the image display panel 50 is exposed from the casing 19a of the image projection unit 19, the image projection unit 19 projects the display light to the light guide unit 60.

As shown in FIG. 1, the light guide unit 60 guides the display light from the image display panel 50 to the windshield 3. The light guide unit 60 according to the present embodiment has a plane mirror 61 and a concave mirror 63. In the present embodiment, the display light from the image display panel 50 first enters the plane mirror 61.

The plane mirror 61 is formed by depositing aluminum as a reflection surface 62 on a surface of a base material made of synthetic resin or glass, or the like. The reflection surface 62 is formed in a smooth planar shape. The display light incident on the plane mirror 61 is reflected by the reflection surface 62 toward the concave mirror 63.

The concave mirror 63 is formed by depositing aluminum as a reflection surface 64 on a surface of a base material made of synthetic resin or glass. The reflection surface 64 is curved in a concave shape so as to be formed in a smooth concave surface shape. The display light incident on the concave mirror 63 is reflected by the reflection surface 64 toward the windshield 3.

A window portion 81 is provided in the housing 80 between the concave mirror 63 and the windshield 3. The window portion 81 is closed by a light transmissive dustproof cover 82. Therefore, the display light from the concave mirror 63 passes through the dustproof cover 82 and is incident on the windshield 3. In this way, the display light reflected by the windshield 3 reaches the visible region EB, and the occupant can visually recognize the virtual image VI. In this example, the virtual image VI is enlarged more than the display surface 54 due to an enlarging action of the concave mirror 63 of the light guide unit 60 and the enlarging action of the windshield 3 when the projection surface 3a of the windshield 3 is curved, and in the state, the virtual image VI is visually recognized by the occupant.

Figure 9:
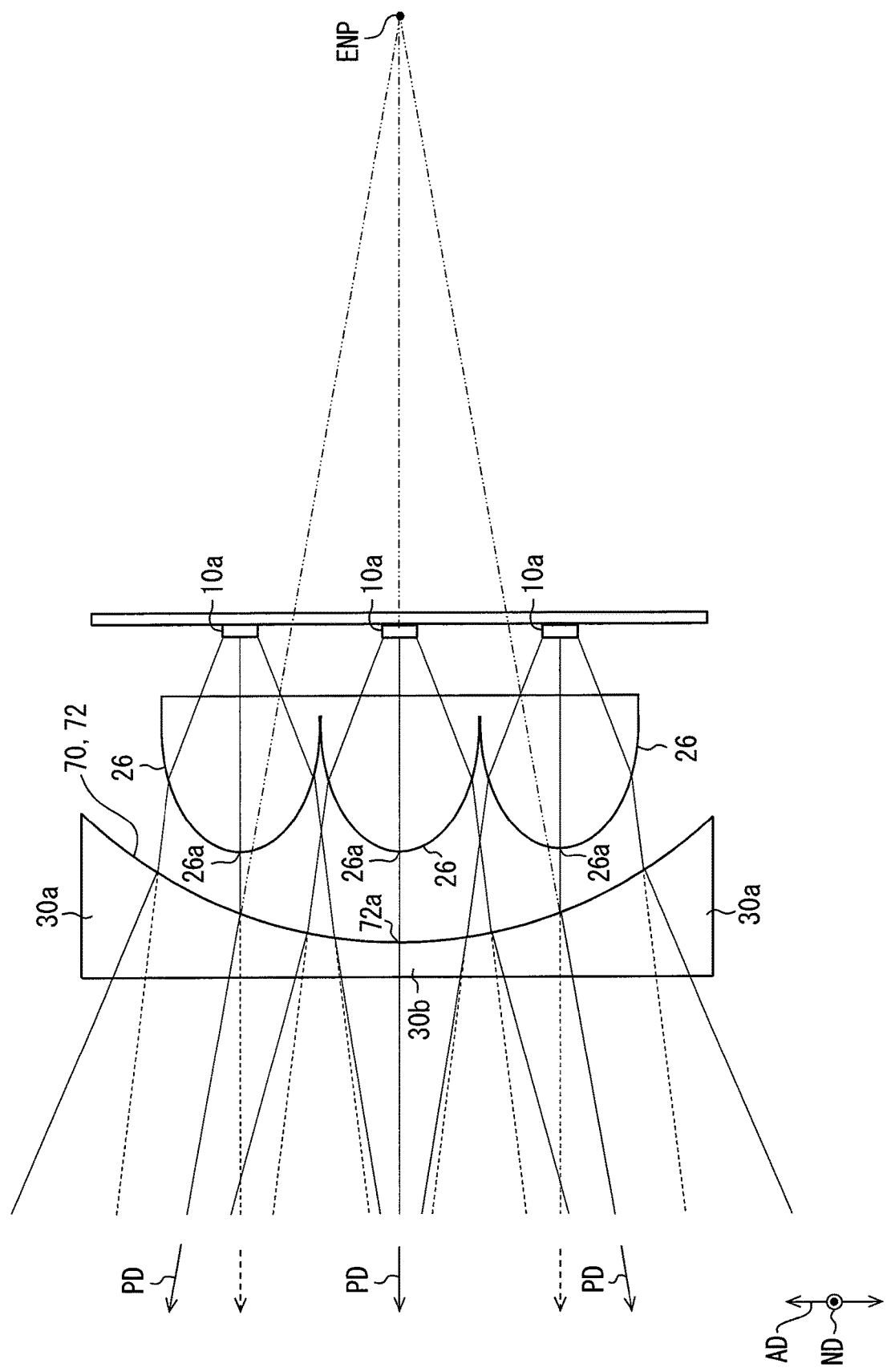
FIG. 9 is a diagram illustrating a diverging action according to the first embodiment.

In the optical system configured by the HUD device 100, a position ENP of an entrance pupil shown in FIG. 9 is present at a position separated by a predetermined distance from the image display panel 50 toward the light emitting device array 10 due to the side effect of the enlargement of the virtual image VI by the light guide unit 60 and the windshield 3. In the case where the HUD device 100 is not provided with the diverging unit 70 and illumination with enhanced telecentricity is performed by the condenser lens 20 and the projection lens 40, if the eye point EP of the occupant moves from the center to an end of the visible region EB, the luminance of the virtual image VI to be viewed can be abruptly reduced.

The light emission peak direction PD of the illumination light emitted from each light emitting device 10a is adjusted to a direction away from the position ENP of the entrance pupil by the diverging action of the diverging unit 70, to thereby restrict a decrease in luminance. The diverging action corresponds to a positional relationship between the light emitting device 10a and the main axis PAd. Specifically, as the distance of the light emitting device 10a from the main axis PAd increases more, the illumination light is refracted more toward the off-axis side by the refractive surface 72. Further, a radiation angle of the illumination light from each light emitting device 10a is widened due to the diverging action. As a result, overlapping of the illumination light from the respective light emitting devices 10a in a narrow range of paraxial is adjusted. Since the illumination light from the respective light emitting devices 10a is widely distributed to the outside of the axis, a reduction in luminance of the virtual image VI at the end of the visible region EB is restricted.

In FIG. 9, broken lines indicate the light emission peak direction from each light emitting device 10a and the range of the illumination light when the diverging unit 70 is not provided are indicated, and solid lines indicate the emission peak direction PD from each light emitting device 10a and the range of the illumination light when the illumination light is subjected to the diverging action of the diverging unit 70.

In the first embodiment, the image display panel 50 corresponds to an "image formation unit", and the diverging lens 30 corresponds to an "optical member" having the diverging unit 70. The condenser lens 20 corresponds to a "first light guide member" that guides the illumination light from the light emitting device array 10 side toward the diverging lens 30 side, and the projection lens 40 corresponds to a "second light guide member" that guides the illumination light from the diverging lens 30 side toward the image display panel 50 side.

Operations and Effects

The operations and effects of the first embodiment which is described above will be described hereinafter.

According to the first embodiment, the diverging lens 30 that is located in the optical path between the light emitting device array 10 and the image display panel 50 has the diverging unit 70. The diverging unit 70 exerts the diverging action in the device array direction AD on the illumination light from the multiple arrayed light emitting devices 10a. The illumination light emitted from the respective light emitting devices 10a is diverged in the device array direction AD, thereby being capable of adjusting an overlapping degree of the illumination lights emitted from the respective light emitting devices 10a. More specifically, the diverging unit 70 has the refractive surface 72 having one main axis PAd in a cross section including the device array direction AD. Since the illumination light from each of the light emitting devices 10a is subjected to the diverging action based on a positional relationship between the light emitting device 10a and corresponding one main axis Pad, the overlapping degree of the illumination lights emitted from the respective light emitting devices 10a can be adjusted according to the array interval of the respective light emitting devices 10a.

Therefore, in the display light of the image formed according to the illumination by the illumination light on the image display panel 50, the light quantity is restricted from being concentrated in a narrow range, and the display light easily spreads over a wide range. As described above, a decrease in the luminance of the virtual image VI when the occupant moves the head more largely can be reduced, and the visibility of the virtual image VI can be enhanced.

Further, according to the first embodiment, the refractive surface 72 is a single surface that is curved in the concave shape in the device array direction AD and refracts the illumination light collectively. Since the illumination light from each light emitting device 10a is diverged by the single surface that is curved in the concave shape, the overlapping degree of the illumination lights emitted from the respective light emitting devices 10a can be reliably adjusted. Therefore, the display light easily spreads over a wide range.

Further, according to the first embodiment, the single refractive surface 72 is formed in a cylindrical surface shape which is curved in the concave shape along the device array direction AD in one direction. With the above configuration, the diverging action is restricted from being exerted on the array orthogonal direction ND where the light emitting devices 10a are not arrayed. Therefore, a loss of illumination to the image display panel 50 can be reduced in the array orthogonal direction ND where the illuminance tends to be insufficient.

Further, according to the first embodiment, since the diverging lens 30 is formed in the concave lens shape, the diverging lens 30 has a thick shape at the outer edge portion 30a. With the use of the thickness of the outer edge portion 30a in the concave lens shape, the diverging lens 30 has the first abutment portion 36 that is in contact with the condenser lens 20 in the light emitting device array 10, and the second abutment portion 38 which is in contact with the projection lens 40 on the image display panel 50 side in the outer edge 30a. Therefore, since the outer edge portion 30a of the diverging lens 30 can function as a spacer between the condenser lens 20 and the projection lens 40, a relative positional deviation of the respective members 20, 30, and 40 is restricted and the stable illumination to the image display panel 50 can be realized. Thus, the visibility of the virtual image VI can be stabilized.

At least a part of each condensing convex surface 26 is located in the space 72b defined by the concave curvature of the refractive surface 72. Since an interval between the refractive surface 72 and each light condensing convex surface 26 can be narrowed by effective utilization of the space 72b, the HUD device 100 with high visibility of the virtual image VI can be realized while restricting an increase in physical size.

Second Embodiment

Figure 10:
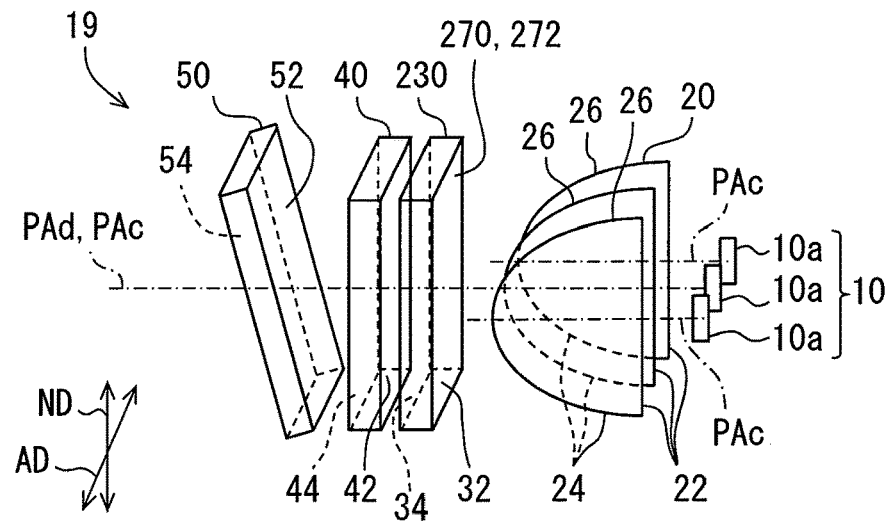
FIG. 10 is a diagram corresponding to FIG. 2 according to a second embodiment.
Figure 11:
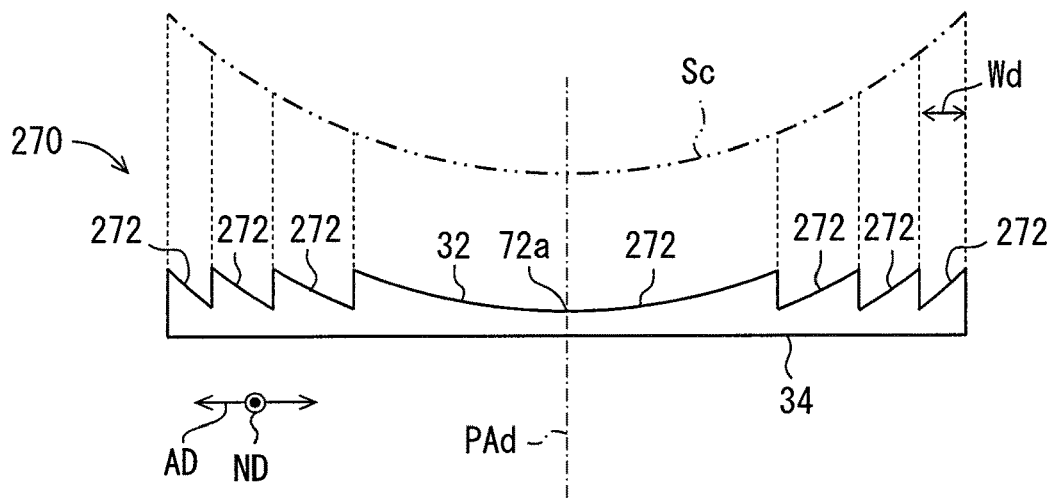
FIG. 11 is a diagram schematically showing a cross section of a divergent lens including a device array direction according to the second embodiment, which is a diagram illustrating multiple refractive surfaces of a diverging unit which is an incident side surface of the diverging lens.

As illustrated in FIGS. 10 and 11, a second embodiment according to the present disclosure is a modification of the first embodiment. A description will be given of the second embodiment, centered on features which differ from those in the first embodiment.

As in the first embodiment, a diverging lens 230 according to the second embodiment is located in an optical path between a light emitting device array 10 and an image display panel 50, more particularly in the optical path between a condenser lens 20 and a projection lens 40. The diverging lens 230 is made of a light transmissive synthetic resin or glass, or the like and has a substantially plate-like shape as a whole.

In the diverging lens 230, an emission side surface 34 that faces the projection lens 40 has a smooth planar shape. On the other hand, in the diverging lens 230, a diverging unit 270 is provided on an incident side surface 32 that faces the condenser lens 20.

As shown in FIG. 11, the diverging unit 270 has multiple refractive surfaces 272 that are arrayed in alignment with a device array direction AD as a surface for refracting an illumination light. The multiple refractive surfaces 272 are formed in a state of being divided into stripes. A dividing direction of the refractive surfaces 272 on an incident side surface 32 is along the device array direction AD, and boundary lines between the adjacent refractive surfaces 272 extend linearly along an array orthogonal direction ND. In this way, the respective refractive surfaces 272 are formed as one divided region which is divided into regions with a predetermined division width Wd.

The multiple refractive surfaces 272 according to the present embodiment are formed based on one virtual concave curved surface Sc defined as a virtual lens surface in the diverging lens 230, and the virtual concave curved surface Sc is divided into a concave Fresnel lens shape. In this example, the virtual concave curved surface Sc has a smooth cylindrical surface shape which is curved into a concave shape concave toward an opposite side to the condenser lens 20 along the device array direction AD.

The virtual concave curved surface Sc configures one main axis PAd substantially orthogonal to an array direction of the refractive surface 272 in a cross section including the device array direction AD (for example, a meridional section including the device array direction AD). The multiple refractive surfaces 272 appear on the incident side surface 32 by shifting the virtual concave curved surface Sc in an extending direction of the main axis PAd for each division width Wd.

Therefore, since the respective centers of curvature of the multiple refractive surfaces 272 in the cross section including the device array direction AD are present on one common main axis PAd, the diverging unit 270 causes the respective refractive surfaces 272 to have one common main axis Pad between the respective refractive surfaces 272. The multiple refractive surfaces 272 cooperate with each other, as a result of which the diverging unit 270 exerts diverging action similar to that in the first embodiment on the illumination light incident from the respective light emitting devices 10a through the paired condensing convex surfaces 26.

According to the second embodiment described above, the multiple refractive surfaces 272 arrayed in alignment with the device array direction AD exert the diverging action in cooperation with each other. In this way, since the diverging unit 270 can be made compact in the extending direction of the main axis PAd, the visibility of the virtual image VI can be enhanced while restricting an increase in the physical size.

In the second embodiment, the diverging lens 230 corresponds to an "optical member" having the diverging unit 270.

Third Embodiment

Figure 12:
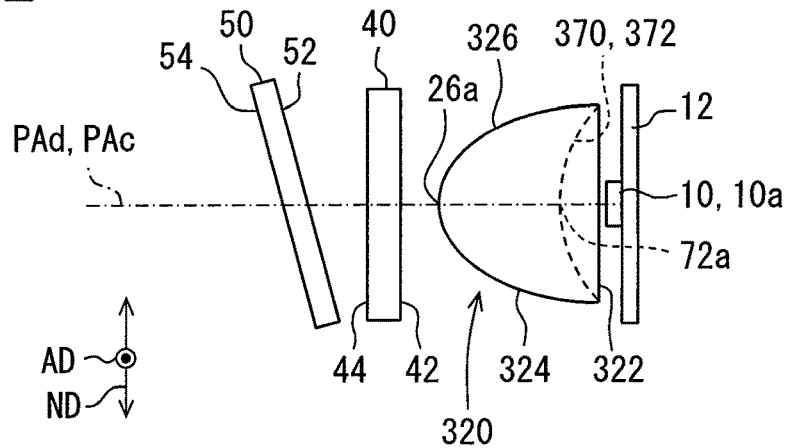
FIG. 12 is a diagram schematically showing an image projection unit according to a third embodiment, which is viewed along a device array direction.
Figure 13:
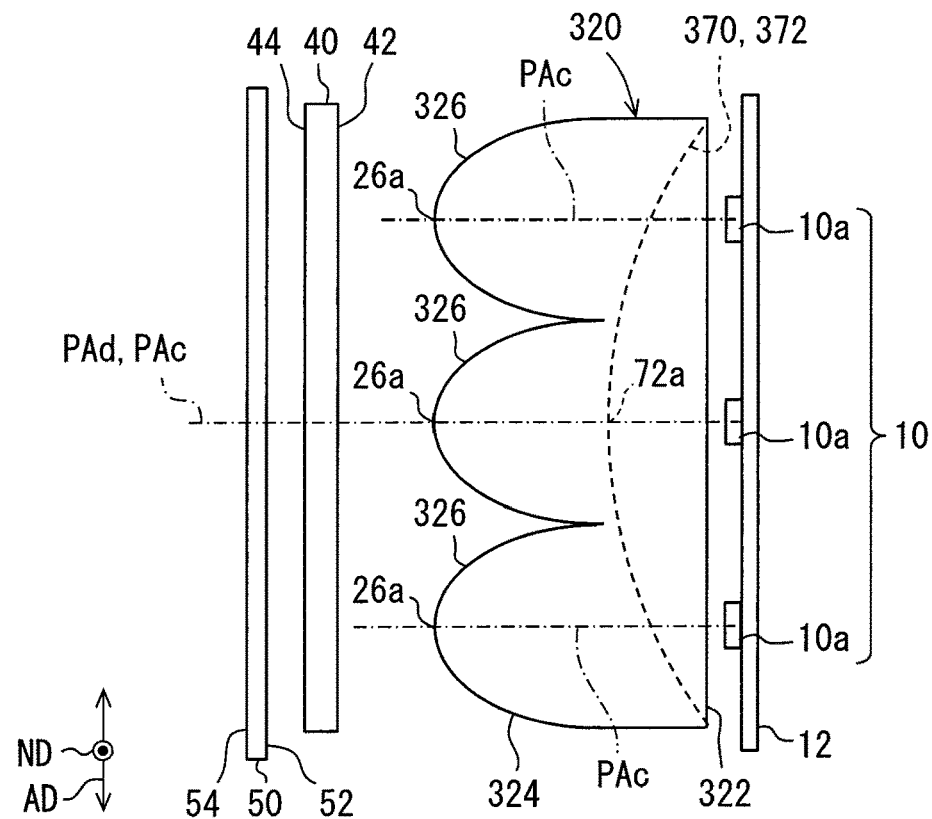
FIG. 13 is a diagram schematically showing an image projection unit according to the third embodiment, which is viewed along an array orthogonal direction.

As illustrated in FIGS. 12 and 13, a third embodiment according to the present disclosure is a modification of the first embodiment. A description will be given of the third embodiment, centered on the points which differ from the first embodiment.

In the third embodiment, unlike the first embodiment, the condensing lens 20 and the diverging lens 30 are not provided, and instead a divergent condenser lens 320 is provided.

The divergent condenser lens 320 is located in an optical path between a light emitting device array 10 and an image display panel 50, more particularly in the optical path between the light emitting device array 10 and a projection lens 40. The divergent condenser lens 320 is made of a light transmissive synthetic resin or glass, or the like.

In the divergent condenser lens 320, a diverging unit 370 is provided on an incident side surface 322 that faces the light emitting device array 10. The diverging unit 370 has a single refractive surface 372 similar to the diverging unit 70 in the diverging lens 30 of the first embodiment. On the other hand, in the divergent condenser lens 320, multiple condensing convex surfaces 326 similar to the condenser lens 320 of the first embodiment are arrayed on an emission side surface 324 that faces the projection lens 40.

In this way, the illumination light from each light emitting device 10a is diverged by the refractive surface 372 of the diverging unit 370. Thereafter, the illumination light from each light emitting device 10a is mainly incident on the paired condensing convex surface 326 and is subjected to the individual condensing action for each condensing convex surface 326. The illumination light subjected to the diverging action and the individual condensing action and emitting from the divergent condenser lens 320 is incident to the projection lens 40.

Likewise, in the third embodiment described above, the diverging unit 370 having the single refractive surface 372 having one main axis PAd in the cross section including the device array direction AD exerts the diverging action in the device array direction AD on the illumination light from each light emitting device 10a. Therefore, the operations and effects similar to those of the first embodiment may be realized.

Further, according to the third embodiment, in the divergent condenser lens 320, the condensing convex surface 326 is formed as a surface on one side, more specifically as an emission side surface 324, and the diverging unit 370 is formed as an incident side surface 322 on an opposite side of the emission side surface 324. With the above configuration, the condensing action exerted individually on the illumination light from each light emitting device 10a and the diverging action in the device array direction AD on the illumination light from each light emitting device 10a can be realized with one member. Therefore, the HUD device 100 with high visibility of the virtual image VI can be easily provided.

In the third embodiment, the divergent condenser lens 320 corresponds to an "optical member" having the diverging unit 370.

Fourth Embodiment

Figure 14:
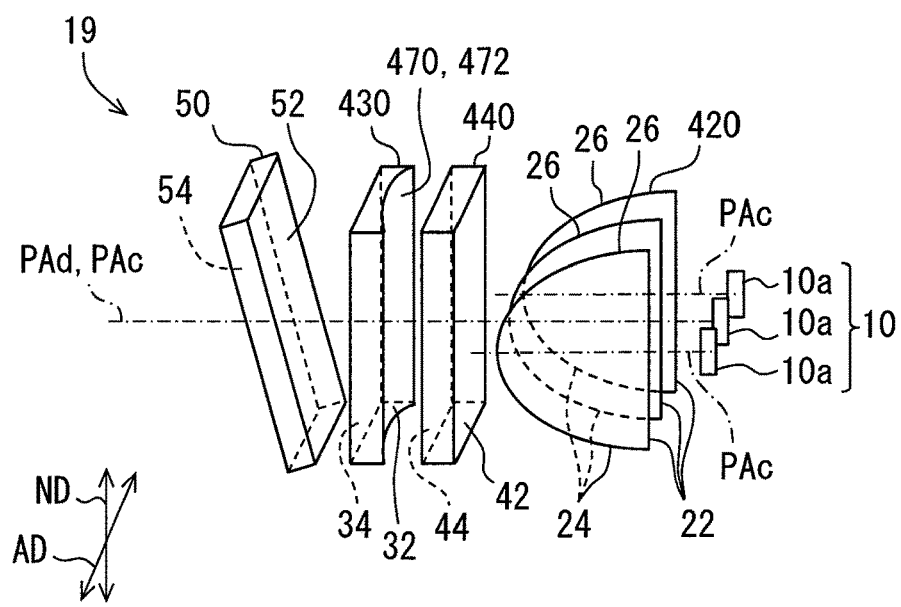
FIG. 14 is a diagram corresponding to FIG. 2 according to a fourth embodiment.

As illustrated in FIG. 14, a fourth embodiment of the present disclosure is a modification of the first embodiment. A description will be given of the fourth embodiment, centered on features which differ from those in the first embodiment.

A projection lens 440 in the fourth embodiment is particularly located in an optical path between a condenser lens 420 and a diverging lens 430. On the other hand, the diverging lens 430 is particularly located in an optical path between the projection lens 440 and an image display panel 50. As a result, the condenser lens 420 and the projection lens 440 are located in the optical path between a light emitting device array 10 and the image display panel 50.

In the diverging lens 430, an emission side surface 34 that faces the image display panel 50 has a smooth planar shape. On the other hand, in the diverging lens 430, a diverging unit 470 is provided on an incident side surface 32 that faces the projection lens 440. The diverging unit 470 has a single refractive surface 472 similar to the diverging unit 70 in the diverging lens 30 of the first embodiment.

The illumination light from each light emitting device 10a passes through the condenser lens 420 and the projection lens 440, and is incident on the diverging lens 430. The diverging unit 470 of the diverging lens 430 exerts the diverging action in the device array direction AD on the illumination light subjected to the condensing action by the condenser lens 420 and the projection lens 440 immediately before illumination of the image display panel 50. The illumination light thus emitted from the diverging lens 430 is incident on the image display panel 50.

Likewise, in the fourth embodiment described above, the diverging unit 470 having the single refractive surface 472 having one main axis PAd in the cross section including the device array direction AD exerts the diverging action in the device array direction AD on the illumination light from each light emitting device 10a. Therefore, the operations and effects similar to those of the first embodiment may be realized.

In addition, according to the fourth embodiment, the diverging unit 470 exerts the diverging action on the illumination light condensed by the condenser lens 420 and the projection lens 440 immediately before illumination of the image display panel 50. Since a part of the illumination light subjected to the diverging action is restricted from diverging to the outside of the image display panel 50, the efficiency of illumination can be enhanced.

In the second embodiment, the diverging lens 430 corresponds to an "optical member" having the diverging unit 470, and the condenser lens 420 and the projection lens 440 are combined together to configure a "condensing unit" that exerts the condensing action on the illumination light from each light emitting device 10a.

Fifth Embodiment

As illustrated in FIGS. 15 to 21, a fifth embodiment according to the present disclosure is a modification of the first embodiment. A description will be given of the fifth embodiment, centered on features which differ from those in the first embodiment.

Figure 15:
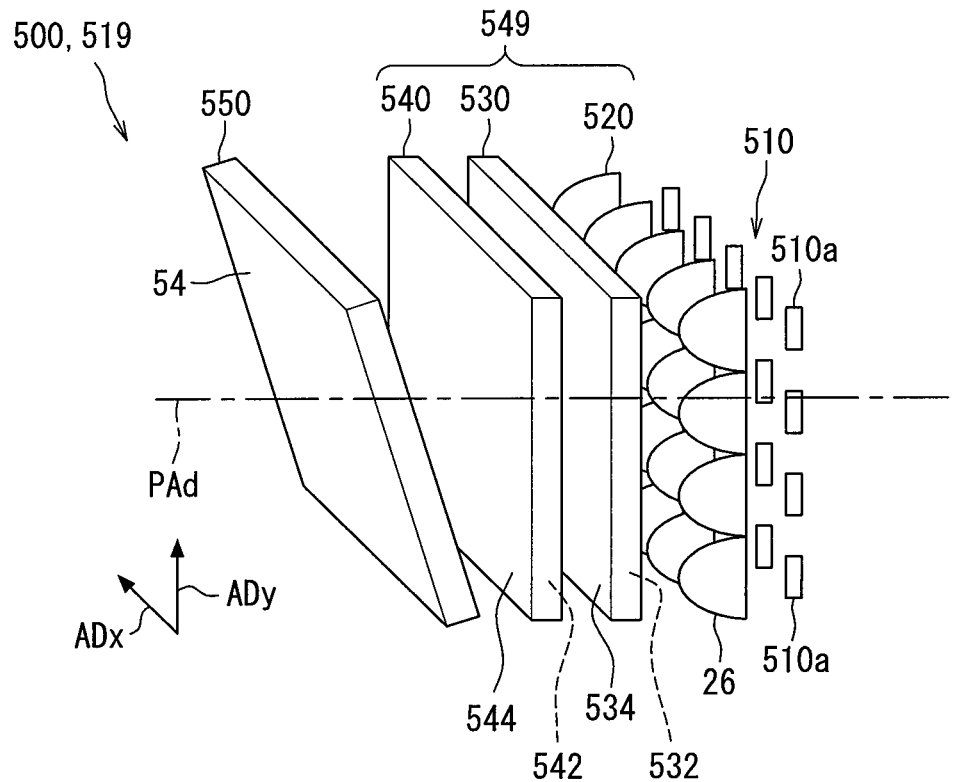
FIG. 15 is a diagram corresponding to FIG. 2 according to a fifth embodiment.
Figure 16:
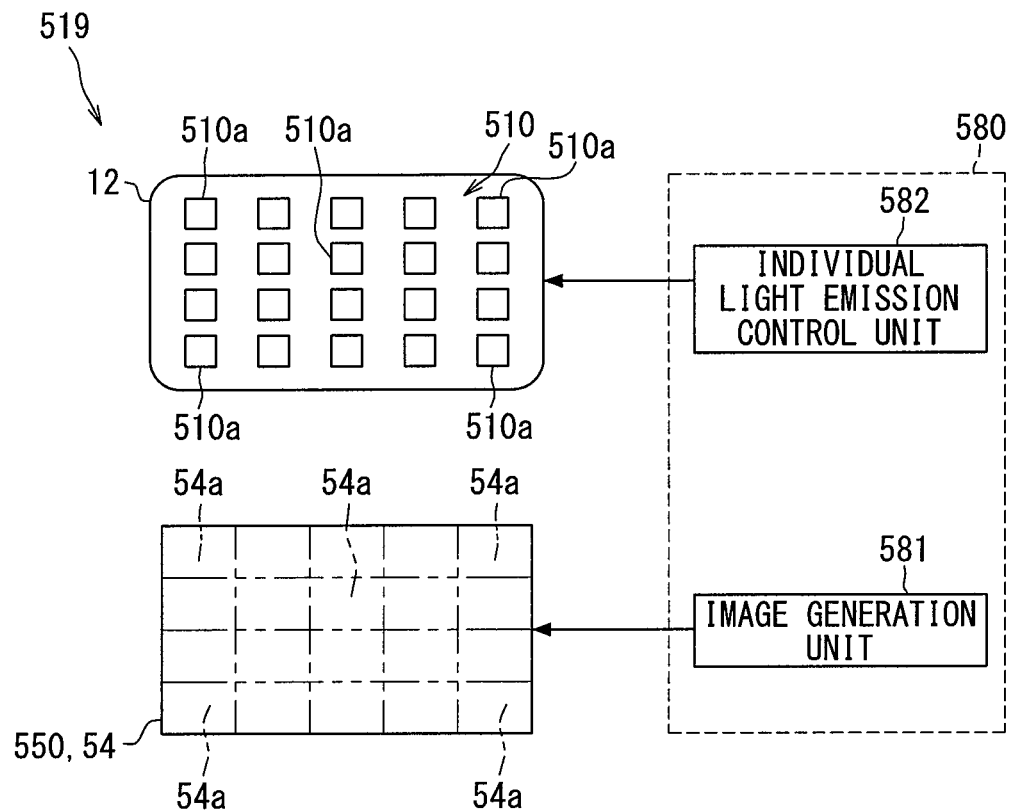
FIG. 16 is a block diagram showing a light emitting device array, an image display panel, an image generation unit, and an individual light emission control unit according to a fifth embodiment.

As shown in FIG. 15, a light emitting device array 510 according to the fifth embodiment has multiple light emitting devices 510a on a light source circuit board 12. As shown in FIG. 16, the multiple light emitting devices 510a are arranged in a matrix in device array directions Adx and ADy in two directions with a predetermined interval from each other. In the present embodiment, the array number of the light emitting devices 510a in the light emitting device array 510 is five in a direction ADx and four in a direction ADy, that is, 5×4, that is, twenty in total.

As shown in FIG. 15, a condenser lens 520, a diverging lens 530, and a projection lens 540 are located between the light emitting device array 510 and an image display panel 550. As in the first embodiment, an image projection unit 519 is configured by the light emitting device array 510, the condenser lens 520, the diverging lens 530, the projection lens 540, the image display panel 550, and so on. The respective members 510, 520, 530, 540, and 550 of the image projection unit are housed in a casing 19a having a light shielding property. The condenser lens 520, the diverging lens 530, and the projection lens 540 configure a backlight optical system 549.

The condenser lens 520 is the same lens array as that in the first embodiment, but, the multiple condensing convex surfaces 26 are arrayed in two directions ADx and ADy according to the array of the light emitting devices 510a in the two directions Adx and Ady.

Figure 17:
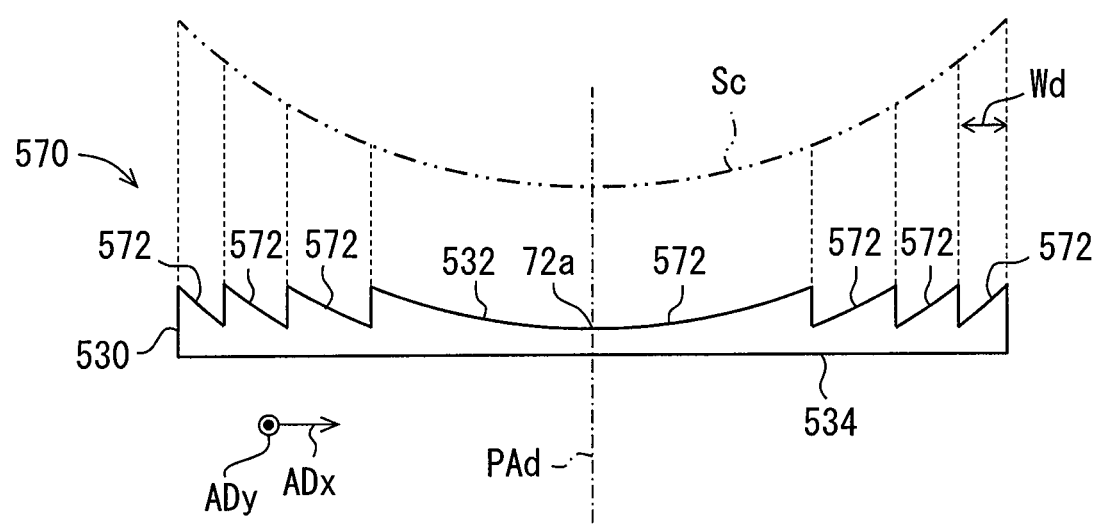
FIG. 17 is a diagram schematically showing a cross section of a divergent lens including a specific direction among device array directions according to the fifth embodiment, which is a diagram illustrating multiple refractive surfaces of a diverging unit which is an incident side surface of the diverging lens.

As shown in FIG. 17, as in the diverging lens of the second embodiment, the diverging lens 530 forms multiple refractive surfaces 572 in a concave Fresnel lens shape obtained by dividing a cylindrical virtual concave curved surface Sc in a direction substantially orthogonal to an extending direction of a generating line of the virtual concave curved surface Sc on an incident side surface 532 of the diverging lens 530. In the present embodiment, the virtual concave curved surface Sc is divided into a specific direction ADx in which the array number of light emitting devices is large (that is, five) in the device array directions ADx and ADy in two directions.

As a result, a diverging unit 570 has multiple refractive surfaces 572 that are arrayed in alignment with the specific direction ADx in one direction as a surface for refracting the illumination light. Since the respective centers of curvature of the multiple refractive surfaces 572 are present on one common main axis PAc, the diverging unit 570 is conceived to configure one main axis PAc common to the respective refractive surfaces 572. The multiple refractive surfaces 572 cooperate with each other to exert the diverging action on the illumination light incident from the respective light emitting devices 510a through the paired condensing convex surfaces 26 in the specific direction ADx of the device array directions ADx and ADy in two directions.

As in the first embodiment, the projection lens 540 is a lens array in which multiple divided blocks 40a are arrayed and formed integrally. However, in the projection lens 540 of the fifth embodiment, the multiple divided blocks 40a are arrayed in two directions according to the array of the light emitting devices 510a in two directions. In other words, twenty divided blocks 40a of 5×4 in total are provided.

Figure 18:
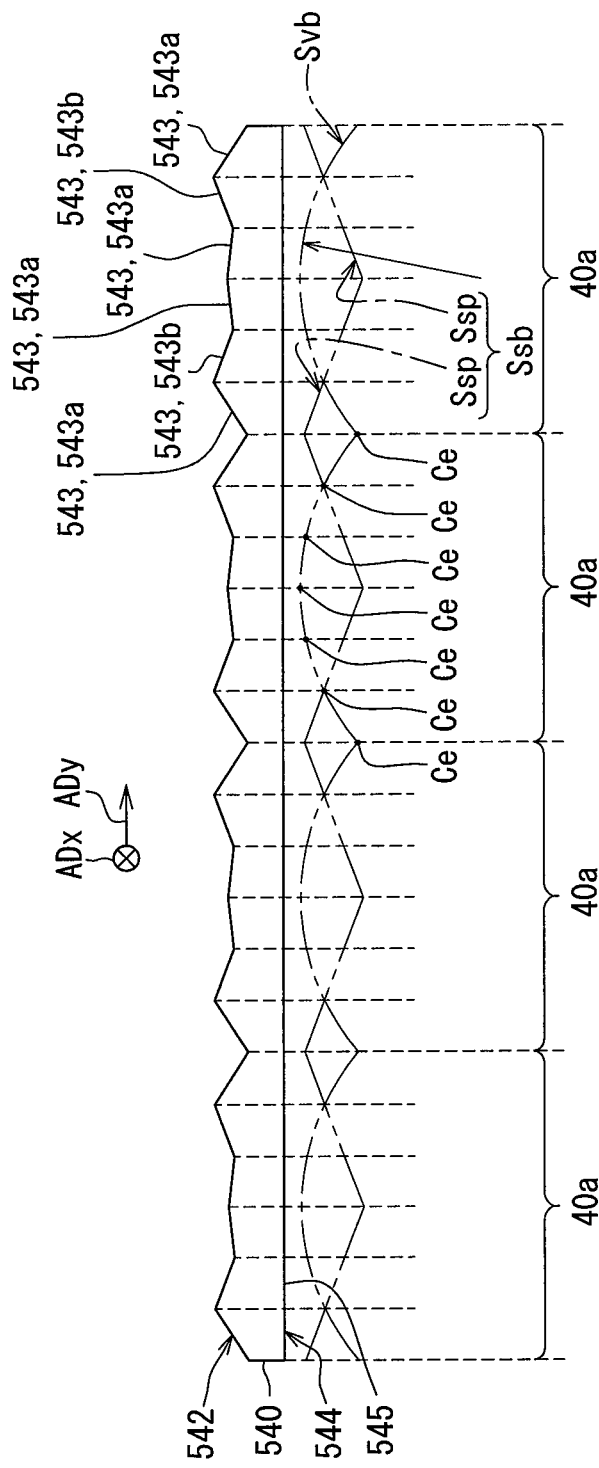
FIG. 18 is a diagram corresponding to FIG. 5 according to the fifth embodiment.

As shown in FIG. 18, multiple divided lens surfaces 543 are formed in a state of being divided into stripes on the incident side surface 542 of the projection lens 540 which faces the diverging lens 530. A dividing direction of the divided lens surfaces 543 on the incident side surface 542 is, for example, along the specific direction ADx in two directions, and boundary lines between the adjacent divided lens surfaces 543 extend linearly along the direction ADy. Therefore, in a cross section including the direction ADy, one divided lens surface 543 is formed across the multiple (specifically, four) divided blocks 40a corresponding to the array number of the light emitting devices 510a in the direction ADy. As with the surfaces 45a and 45b of the first embodiment, the divided lens surface 543 is provided with multiple approximate planes 543a and multiple anisotropic deflection planes 543b.

Figure 19:
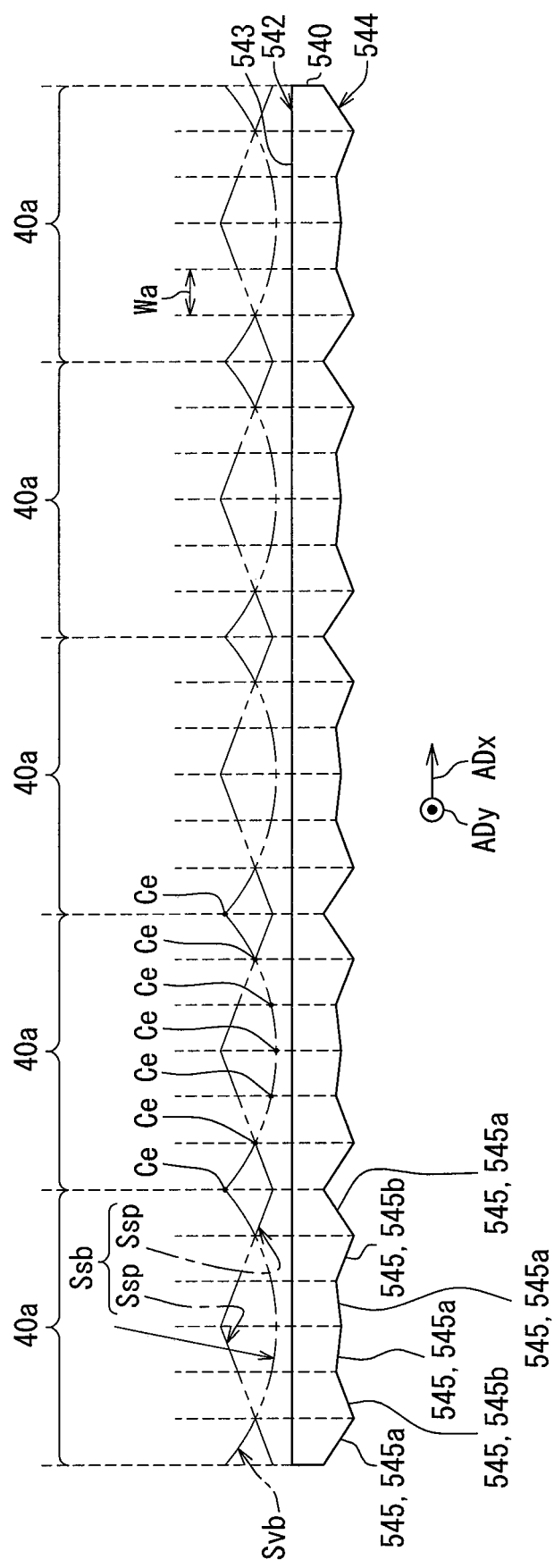
FIG. 19 is a diagram corresponding to FIG. 5 according to the fifth embodiment.

On the other hand, as shown in FIG. 19, multiple divided lens surfaces 545 are formed in a state of being divided into stripes on the emission side surface 544 of the projection lens 540 which faces the image display panel 550. A dividing direction of the divided lens surfaces 545 on the emission side surface 544 is along the direction ADy in two directions and boundary lines between the adjacent divided lens surfaces 545 extend linearly along the specific direction ADx. Therefore, in a cross section including the specific direction ADx, one divided lens surface 545 is formed across the multiple (specifically, five) divided blocks 40a corresponding to the array number of the light emitting devices 510a in the direction ADx. As with the surfaces 45a and 45b of the first embodiment, the divided lens surface 545 is provided with multiple approximate planes 545a and multiple anisotropic deflection planes 545b.

In the projection lens 540 having such a complicated shape, it is difficult to prescribe one main axis, and there are substantially multiple axes. Considering that the approximate planes 543a and 545a have the substantial condensing action, it can be considered that the main axes of the same number (that is, 20) as that of the divided blocks 40a are provided by the aggregation of the approximate planes 543a and 545a.

Figure 20:
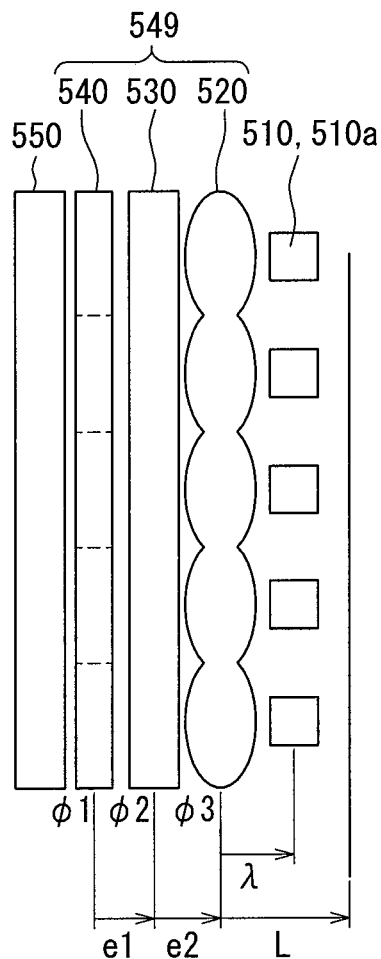
FIG. 20 is a diagram illustrating an arrangement of the light emitting device array according to the fifth embodiment.

In this example, as shown in FIG. 20, an optical power of the projection lens 540 is defined as $\phi1$ (>0) and an optical power of the diverging lens 530 is defined as $\phi2$ (<0), which can be calculated with the use of the virtual convex curved surface Svb that is the basis of the approximate planes 543a and 545a of the projection lens 540, and an optical power of the condenser lens 520 that can be calculated with the use of the condensing convex surface 26 of the condenser lens 520 is defined as $\phi3$ (>0). Further, an interval between a position of the principal point of the projection lens 540 and a position of the principal point of the diverging lens 530 is defined as e1, and an interval between the principal point of the diverging lens 530 and the principal point of the condenser lens 520 is defined as e2. The position of each principal point may be replaced with a main plane which is a virtual plane including the principal point.

Under the above definitions, a distance L from the position of the principal point of the condenser lens 520 to the position of a composite focal point of the backlight optical system 549 is expressed as follows.

$$L=[1-e2\cdot(1+\phi1+\phi2)+e1\cdot(1+\phi1)\cdot(-1+e2\cdot\phi2)]/[1+\phi1-(-1+e1+e1\cdot\phi1)\cdot\phi2+(1-e2(1+\phi1+\phi2)+e1\cdot(1+\phi1)\cdot(-1+e2\cdot\phi2))\cdot\phi3] \quad \text{(Ex. 1)}$$

In this example, the position of the entrance pupil ENP (also refer to a schematic view of FIG. 9) is located at a position away from the image display panel 550 than the position of the principal point of the projection lens 540, and in order to image the respective light emitting devices on the entrance pupil ENP, a distance λ from the position of the principal point of the condenser lens 520 to the light emitting device array 510 satisfies the following condition.

$$0<\lambda\leq L \quad \text{(Ex. 2)}$$

In other words, the light emitting device array 510 is located between the position of the principal point of the condenser lens 520 and the position of the composite focal point on a side of the backlight optical system 549 opposite to the image display panel 550.

Further, as shown in FIG. 16, the HUD device 500 according to the present embodiment further includes an image generation unit 581 and an individual light emission control unit 582 as components of the image projection unit 519. The image generation unit 581 and the individual light emission control unit 582 are configured as functional blocks realized by the control circuit 580. The control circuit 580 is an electronic circuit having at least one processor, a memory such as ROM or RAM and an input-output interface. The processor realizes the functions of the image generation unit 581 and the individual light emission control unit 582, for example, by executing a computer program stored in the memory. The control circuit 580 is capable of communicating with the image display panel 550 and the respective light emitting devices 510a of the light emitting device array 510 as well as external devices through the input-output interface. Meanwhile, the control circuit 580 may be provided in common between the image generation unit 581 and the individual light emission control unit 582, or may be provided separately. Further, in the present embodiment, the control circuit is accommodated in the housing 80, but may be located outside the housing 80.

The image generation unit 581 generates data of an image to be displayed on the display surface 54 of the image display panel 550. Specifically, the image generation unit 581 generates the image data based on information input as an electric signal from the external device. For example, when a speed of a vehicle is input from the external device, the image generation unit 581 generates the image data indicating the speed on at least a part of the display surface 54. The image data in the present embodiment is, for example, data indicating RGB values (gradation values in 256 levels) for each unit of the liquid crystal pixel 50a (also refer to FIG. 8). The electric signal based on the image data of the image generation unit 581 is output to the image display panel 550, to thereby control the transmittance of each liquid crystal pixel 50*a* of the image display panel 550.

The individual light emission control unit 582 controls each light emitting device 510*a* to an individual light emission intensity corresponding to the image data generated by the image generation unit 581.

More specifically, display divided regions 54*a* are defined by dividing the entire region of the display surface 54 of the image display panel 550 by each array number of the light emitting devices 510*a* arrayed in the respective device array directions Adx and ADy. In other words, the display surface 54 is virtually divided into 20 display divided regions 54*a* of 5×4 in total, and the respective display divided regions 54*a* are associated with the light emitting devices 510*a* that mainly illuminate the respective display divided regions 54*a*, individually.

The individual light emission control unit 582 determines and controls the light emission intensity of the light emitting devices 510*a* corresponding to the area 54*a* with reference to the above-mentioned image data corresponding to the area 54*a* for each display divided region 54*a*, individually. For example, the individual light emission control unit 582 turns off the light emitting device 510*a* corresponding to the display divided region 54*a* in which the image based on the image data generated by the image generation unit 581 is not displayed, among the light emitting devices 510*a*. In more detail, the individual light emission control unit 582 determines whether an image to be displayed in the display divided region 54*a* is present, or not, for each display divided region 54*a*. Then, the individual light emission control unit 582 turns off the light emitting device corresponding to the display divided region 54*a* in which the image to be displayed is not present, that is, the display is not displayed.

Whether the image to be displayed in the display divided region 54*a* is present, or not, is determined with reference to the RGB values which are a unit of each liquid crystal pixel 50*a* within the display divided region 54*a* in the image data. More specifically, when all of the RGB values in a certain display divided region 54*a* are (0, 0, 0) gradation values indicating black, it is determined that there is no image to be displayed in the display divided region 54*a*. As another method, if X, Y, Z are all equal to or less than a predetermined value in all of the RGB values (X, Y, Z) in a certain display divided region 54*a*, a method of determining that the image to be displayed in the display divided region 54*a* is not present may be employed. As another method, if all of the RGB values in a certain display divided region 54*a* are the same value, a method of determining that there is no image to be displayed in the display divided region 54*a* may be employed.

Figure 21:
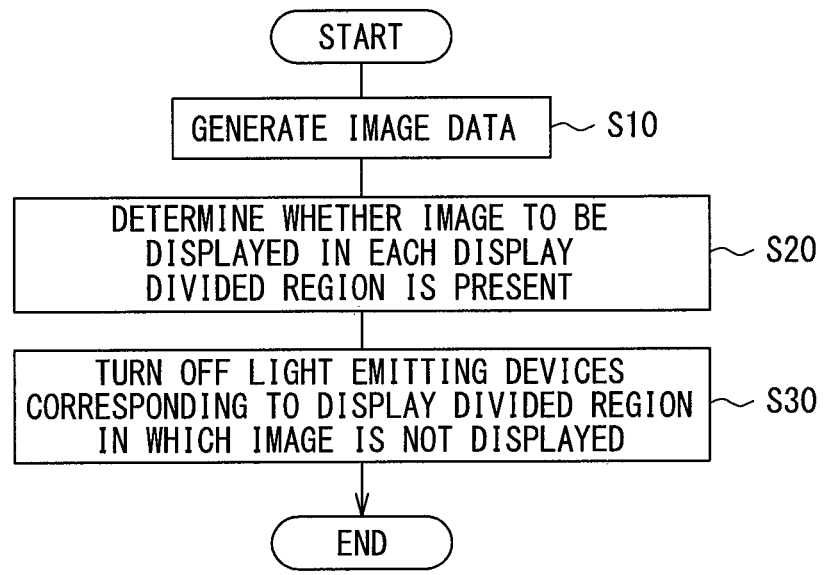
FIG. 21 is a flowchart of an HUD device according to the fifth embodiment.

The process described above will be described with reference to a flowchart of FIG. 21. The flowchart of FIG. 21 is executed each time the image to be displayed on the image display panel 550 is rewritten.

First, in Step S10, the image generation unit 581 generates image data. After processing in Step S19, the process proceeds to Step S20.

In Step S20, the individual light emission control unit 582 determines whether there is an image to be displayed in each display divided region 54*a*, or not. After the process of Step S20, the process proceeds to Step S30.

In Step S30, the individual light emission control unit 582 turns off the light emitting device 510*a* corresponding to the display divided region 54*a* in which the image is not displayed. At the same time, the image generation unit 581 rewrites the image displayed on the image display panel 550. With the above processing, a series of processing is completed.

The individual light emission control unit 582 also adjusts the light emission intensity of the light emitting device 510*a* corresponding to the display divided region 54*a* in which the image to be displayed is present. In other words, in addition to controlling the transmittance of each liquid crystal pixel 50*a* of the image display panel 550, the light emission intensity of each light emitting device 510*a* is adjusted so that a dynamic range of the display light from the image display panel 550 (for example, a ratio of a minimum luminance value to a maximum luminance value of the display light) is enlarged to enhance an expression power of the virtual image VI.

Likewise, in the fifth embodiment described above, the diverging unit 570 having the multiple refractive surfaces 572 having one main axis PAd in the cross section including the specific direction ADx exerts the diverging action in the specific direction ADx on the illumination light from each light emitting device 510*a*. Therefore, the operations and effects similar to those of the first embodiment may be realized.

According to the fifth embodiment, the diverging lens 530 that is located in the optical path between the light emitting device array 510 and the image display panel 550 has the diverging unit 570. The diverging unit 570 exerts the diverging action in the specific direction ADx on the illumination light from the multiple arrayed light emitting devices 510*a*. The illumination light emitted from the respective light emitting devices 510*a* is subjected to the diverging action in the specific direction ADx, thereby being capable of adjusting an overlapping degree of the illumination lights emitted from the respective light emitting devices 510*a*.

Therefore, in the display light of the image formed according to the illumination by the illumination light on the image display panel 550, when the overlapping degree is adjusted so that the light quantity is restricted from being concentrated in a narrow range, the display light easily spreads over a wide range. As described above, a decrease in the luminance of the virtual image VI when the occupant moves the head more largely can be reduced, and the visibility of the virtual image VI can be enhanced.

In addition, according to the fifth embodiment, the diverging unit 70 has the refractive surface 572 having one main axis PAd in a cross section including the specific direction ADx. Since the illumination light from each of the light emitting devices 510*a* is subjected to the diverging action based on a positional relationship between the light emitting device 510*a* and corresponding one main axis Pad, the overlapping degree of the illumination lights emitted from the respective light emitting devices 510*a* can be adjusted according to the array interval of the respective light emitting devices 510*a*.

According to the fifth embodiment, the diverging lens 530 forms the multiple refractive surfaces 572 in a concave Fresnel lens shape obtained by dividing the cylindrical virtual concave curved surface Sc in the specific direction, and the multiple refractive surfaces 572 cooperate with each other to exert the diverging action. In this way, since the diverging unit 570 can be made compact in the extending direction of the main axis PAd, the visibility of the virtual image VI can be enhanced while restricting an increase in the physical size. The diverging action is exerted only in a direction in which the occupant moves his head frequently and the diverging action in a direction in which the head moving frequency is low is restricted, thereby being capable of restricting a decrease in the luminance of the virtual image VI, and the visibility of the virtual image VI is further increased.

In the fifth embodiment, the specific direction ADx in which the diverging action is exerted is the direction corresponding to the lateral direction of the vehicle on the horizontal plane in the virtual image VI to be viewed. In other words, when the occupant moves his head in the lateral direction, the effects of the diverging action can be enjoyed.

Further, according to the fifth embodiment, since the light emitting devices 510a are controlled to have individual light emission intensities, the light emitting device 510a corresponding to the non-display region of the image of the image display panel 550 is dimmed or turned off, thereby being capable of achieving an improvement in a contrast of the virtual image VI and a reduction in the power consumption, and enlarging the dynamic range of the display light from the image display panel 550.

Further, according to the fifth embodiment, among the light emitting devices 510a, the light emitting device 510a corresponding to the display divided region 54a in which the image is not displayed is turned off. With such turn-off, the contrast with the region in which the image is displayed is improved in the virtual image VI while reducing the power consumption, and the visibility of the virtual image VI can be enhanced.

Further, according to the fifth embodiment, the light emitting device array 510 is placed between the position of the principal point of the condenser lens 520 which is located at a position farthest from the image display panel 550 among the respective members 520, 530, and 540 of the backlight optical system 549 and the position of the composite focal point of the backlight optical system 549. With such a placement, since imaging of the respective light emitting devices 510a on the entrance pupil ENP is easily realized, an unintentional luminance difference when comparing the display positions with each other in the image display panel 550 (for example, the pixels 50a) can be reduced while the luminance of the virtual image VI to be visible in the visible region EB can be enhanced. Therefore, the visibility of the virtual image VI can be improved.

In the fifth embodiment, the image display panel 550 corresponds to an "image formation unit", and the diverging lens 530 corresponds to an "optical member" having the diverging unit 570.

Sixth Embodiment

Figure 22:
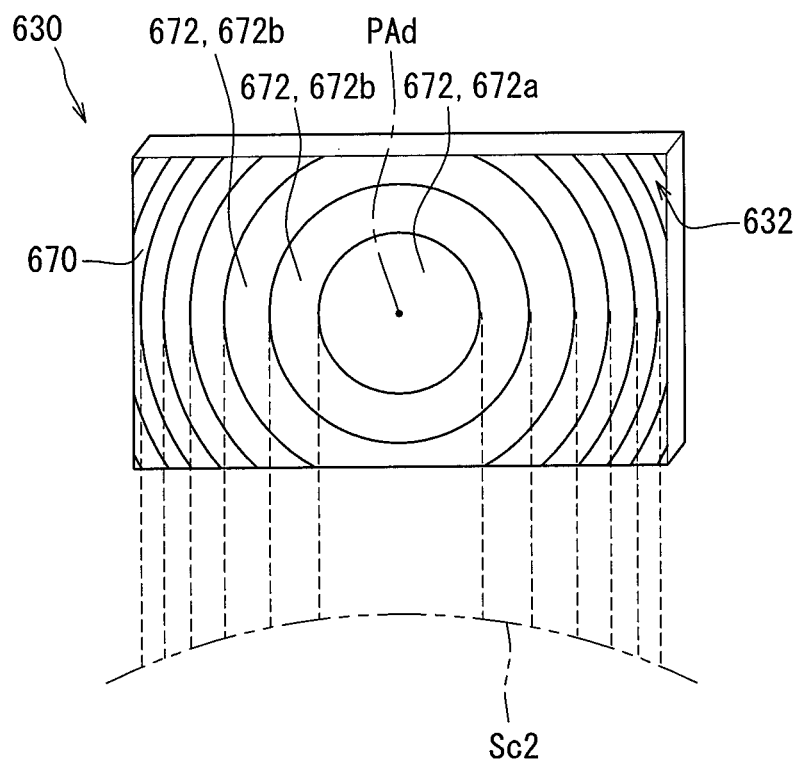
FIG. 22 is a diagram showing a diverging lens according to a sixth embodiment.

As illustrated in FIG. 22, a sixth embodiment of the present disclosure is a modification of the fifth embodiment. A description will be given of the sixth embodiment, centered on features which differ from those in the fifth embodiment.

A diverging lens 630 according to the sixth embodiment forms multiple refractive surfaces in a concave Fresnel lens shape in which a spherical virtual concave curved surface Sc2 is concentrically divided on an incident side surface 632 of the diverging lens 630. Among the multiple refractive surfaces 672, a central refractive surface 672a that overlaps with a center of a display surface of an image display panel and includes a surface vertex has a circular shape. The other refractive surfaces 762b are formed in a toric or partially toric shape. In the present embodiment, the virtual concave curved surface Sc2 has a smooth spherical shape which is curved in a concave shape concave on a side opposite to the condenser lens 520.

As a result, a diverging unit 670 has multiple refractive surfaces 672 which are concentrically arrayed as a surface for refracting the illumination light. Since the respective centers of curvature of the multiple refractive surfaces 672 are present on one common main axis PAd, the diverging unit 670 is conceived to have one main axis common to the respective refractive surfaces 672. The multiple refractive surfaces 672 cooperate with each other to exert the diverging action on the illumination light incident from the respective light emitting devices 510a through the paired condensing convex surfaces 26 in the respective device array directions ADx and ADy in two directions.

Likewise, in the sixth embodiment described above, the diverging unit 670 having the multiple refractive surfaces 672 having one main axis PAd in the cross section including the specific directions ADx and ADy in two directions among the device array directions exerts the diverging action in the specific directions ADx and ADy on the illumination light from each light emitting device 510a. Therefore, the operations and effects similar to those of the first embodiment may be realized.

In addition, according to the sixth embodiment, the diverging lens 630 forms the multiple refractive surfaces 672 in a concave Fresnel lens shape obtained by dividing the spherical virtual concave curved surface Sc2 concentrically, and the multiple refractive surfaces 672 cooperate with each other to exert the diverging action. In this way, since the diverging unit 670 can be made compact in the extending direction of the main axis PAd, the visibility of the virtual image VI can be enhanced while restricting an increase in the physical size. The diverging action is exerted on the illumination light in each direction, as a result of which if the overlapping degree is adjusted in each direction, the display light easily spreads in a wide range. As described above, a decrease in the luminance of the virtual image VI can be restricted regardless of the direction along which the occupant moves his head, and the visibility of the virtual image VI can be enhanced.

Incidentally, the diverging lens 630 corresponds to an "optical member" having the diverging unit 670.

Other Embodiments

Hereinbefore, multiple embodiments of the present disclosure are described. However, the present disclosure is not interpreted to be limited to the embodiments, and various embodiments and combinations thereof may be applied within a scope which does not depart from the gist of the present disclosure.

Figure 23:
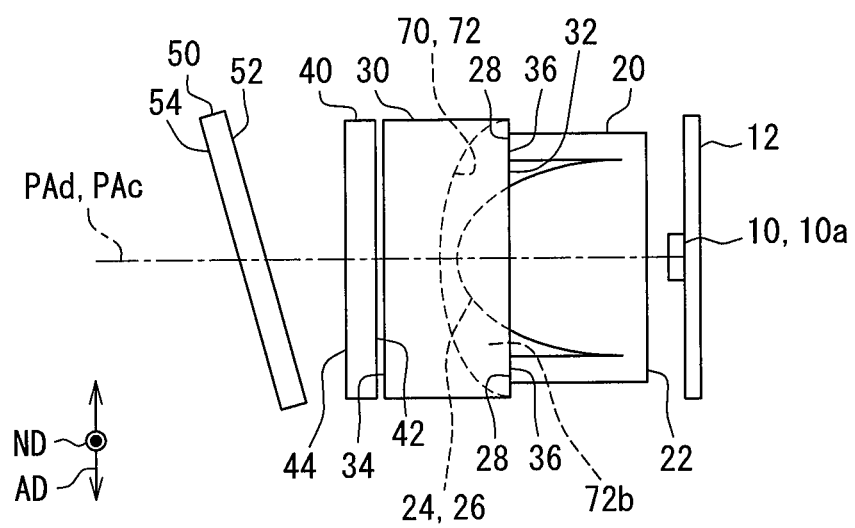
FIG. 23 is a diagram corresponding to FIG. 12 in one example of Modification 12.

More specifically, as Modification 1 relating to the first, third, and fourth embodiments, if the single refractive surface 72 may have one main axis PAd in the cross section including the device array direction AD, various shapes can be employed. For example, as shown in FIG. 23, the refractive surface 72 may be formed in a spherical shape which is curved in the concave shape also in the array orthogonal direction ND. Further, for example, an aspherical surface (including a paraboloid surface) having rotational symmetry with respect to the main axis PAd may be adopted as the refractive surface 72. For example, as the refractive surface 72, an anamorphic surface such as a toroidal surface may be adopted. When the main axis PAd can be defined with the use of the surface vertex 72a of the refractive surface 72, if the center of curvature defined by the coordinates of the refractive surface 72 other than the surface vertex 72a is not located largely away from the main axis PAd, it is assumed that the refractive surface 72 configures one main axis PAd.

In Modification 2 of the first embodiment, the abutment receiving portion 28 of the condenser lens 20 may be formed as a protrusion. In an example shown in FIG. 15, a sag amount at the first abutment portion 36 of the single refractive surface 72 is smaller than the sag amount at an outer circumferential edge of the condensing convex surface 26. For that reason, in order to bring the first abutment portion 36 and the abutment receiving portion 28 of the condenser lens 20 into contact with each other without bringing the refractive surface 72 and the condensing convex surface 26 into contact with each other, the abutment receiving portion 28 is provided as a protrusion protruding toward the diverging lens 30.

As Modification 3, various shapes can be adopted as the projection lens 40. For example, as the projection lens 40, a convex Fresnel lens, an ordinary convex lens or the like may be adopted.

In Modification 4, the HUD device 100 may not include at least one of the condenser lens 20 and the projection lens 40.

In Modification 5, the image display panel 50 is located such that the normal direction of the display surface 54 is along the light emission peak direction PD immediately after emission from the light emitting device array 10, the directions of the main axes PAc and PAd, and the plate thickness direction of the projection lens 40.

In Modification 6, various configurations can be adopted as the configuration of the light guide unit 60. For example, the light guide unit 60 may be configured by only the concave mirror 63, or may have a convex mirror instead of the plane mirror 61.

In Modification 7 relating to the first to fourth embodiments, the light emitting devices 10a may be arrayed in multiple directions (for example, two directions) in the device array direction AD. In that case, as long as the diverging unit 70 configures one main axis PAd in the cross section including at least one specific direction among the multiple device array directions AD, a decrease in luminance of the virtual image VI when the occupant moves his head more largely in the specific direction can be restricted.

In Modification 8 of the first embodiment, the refractive surface 72 of the diverging unit 70 may be provided as the emission side surface 34 of the diverging lens 30 so as to face the incident side surface 42 of the projection lens 40. Further, the incident side surface 42 may have a condensing convex surface that exerts the condensing action on the illumination light by being curved in the convex shape in the device array direction AD. In addition, at least a part of the condensing convex surface may be located in the space 72b defined by a concave curvature of the refractive surface 72.

In Modification 9, the diverging unit 70 or 570 as a whole is recognized as exerting the diverging action on the illumination light from the light emitting device 10a or 510a in any one of the device array direction AD, ADx, or Ady, the diverging unit 70 or 570 may include the refractive surface 72 or 572 or a part of the refractive surface 72 or 572 which is unlikely to have one main axis PAd. Incidentally, the diverging action in the present disclosure means an action of expanding a light beam by, for example, applying a negative optical power or the like, and differs from a diffusion action of dispersing light in various directions by a random element such as a diffusion plate.

In Modification 10 relating to the fifth and sixth embodiments, the individual light emission control unit 582 may control the light emission intensity of the light emitting element 510a corresponding to the display divided region 54a in which the image is not displayed among the respective light emitting elements 510a to be smaller than the light emission intensity of the light emitting device 510a corresponding to the display divided area 54a in which the image is displayed.

In Modification 11 related to the first to fourth embodiments, the HUD device 100 may include the image generation unit 581 and the individual light emission control unit 582 similar to those in the fifth embodiment. Also, as in the fifth embodiment, it is preferable that the HUD device 100 is located between the position of the principal point of the condenser lens 20 and the position of the composite focal point of the members 10, 20, and 30 configuring the backlight optical system.

Figure 24:
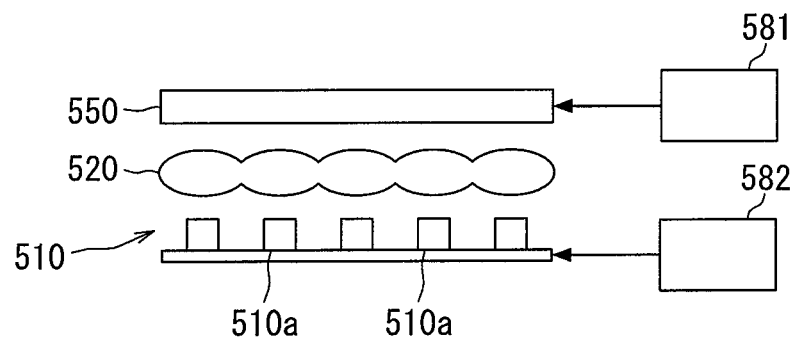
FIG. 24 is a diagram showing one example of Modification 12.
Figure 25:
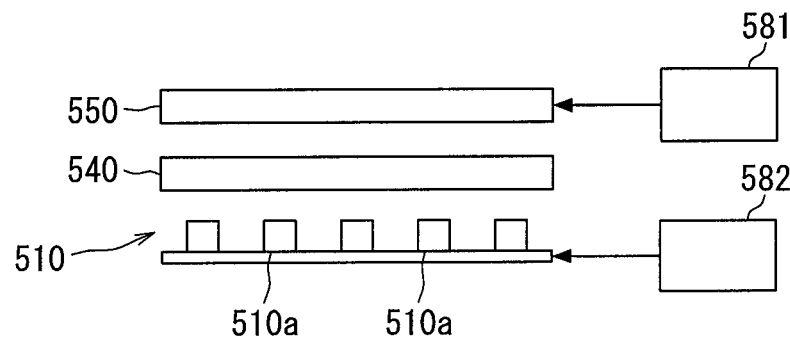
FIG. 25 is a diagram showing another example of Modification 12.
Figure 26:
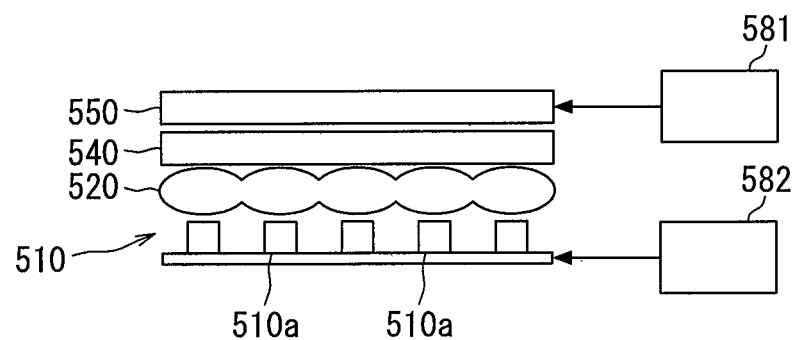
FIG. 26 is a diagram showing still another example of Modification 12.

As Modification 12 of the fifth and sixth embodiments, a configuration in which the diverging unit 570 is not provided for the HUD device 500 and the image projection unit 519 including the individual light emission control unit 582 can be employed. For example, as shown in FIG. 24, the image projection unit 519 may be configured by the light emitting device array 510, the condenser lens 520, the image display panel 550, and so on. As shown in FIG. 25, the image projection unit 519 may be configured by the light emitting device array 510, the projection lens 540, the image display panel 550, and so on. As shown in FIG. 26, the image projection unit 519 may be configured by the light emitting device array 510, the condenser lens 520, the projection lens 540, the image display panel 550, and so on.

In Modification 13, the present disclosure may be applied to various movable objects (transportation equipment) such as vessels or aircraft other than the vehicle 1.

The head-up display device having one configuration according to the disclosure is mounted on the movable object 1 and projects the display light of an image on the projection member 3 and reflects the display light from the projection member 3, to thereby display the virtual image of the image visible to the occupant. The head-up display device includes the light emitting device array 510 in which the multiple light emitting devices 510a emitting the illumination light are arrayed in the multiple device array directions ADx and ADy. The head-up display device further includes an image formation unit 550 that forms an image according to illumination by the illumination light and emits the image as the display light. The head-up display device further includes the optical members 570 and 670 having the diverging units 570 and 670 which are located in the optical path between the light emitting device array and the image formation unit, and exerts the diverging action in at least one specific direction among the multiple device array directions on the illumination light from the respective light emitting devices. The diverging unit includes one or more refractive surfaces 572 and 672 that refract the illumination light while exerting the diverging action.

According to the above disclosure, the optical member which is located in the optical path between the light emitting device array and the image formation unit has the diverging unit. The diverging unit exerts the diverging action in the specific direction among the multiple device array directions on the illumination light from the multiple arrayed light emitting devices. The illumination light emitted from the respective light emitting devices is subjected to the diverging action in the specific direction, thereby being capable of adjusting the overlapping degree of the illumination lights emitted from the respective light emitting devices.

Therefore, in the display light of the image formed according to the illumination by the illumination light by the image formation unit, when the overlapping degree is adjusted so that the light quantity is restricted from being concentrated in the narrow range, the display light easily spreads over a wide range. As described above, a decrease in the luminance of the virtual image when the occupant moves his head more largely can be restricted, and the visibility of the virtual image can be enhanced.

In addition, according to another configuration of the disclosure, one or more refractive surfaces have one main axis PAd in the cross section including the specific direction.

According to the above disclosure, since the illumination light from each of the light emitting devices is subjected to the diverging action based on a positional relationship between the light emitting device and corresponding one main axis, the overlapping degree of the illumination lights emitted from the respective light emitting devices can be adjusted according to the array interval of the respective light emitting devices.

The head-up display device according to another configuration of the disclosure is mounted on the movable object 1 and projects the display light of the image on the projection member 3 and reflects the display light from the projection member 3, to thereby display the virtual image of the image visible to the occupant. The head-up display device includes the light emitting device array 10 in which the multiple light emitting devices 10*a* emitting the illumination light are arrayed in the device array direction AD. The head-up display device further includes the image formation unit 50 that forms the image according to illumination by the illumination light and emits the image as the display light. The head-up display device further includes the optical members 30, 230, 320, and 430 having the diverging units 70, 270, 370, and 470 which are located in the optical path between the light emitting device array and the image formation unit, and exerts the diverging action in the device array direction on the illumination light from the respective light emitting devices. The diverging unit includes one or more refractive surfaces 72, 272, 372, and 472 that refract the illumination light. One or more refractive surfaces have one main axis PAd in the cross section including the device array direction.

According to the above disclosure, the optical member which is located in the optical path between the light emitting device array and the image formation unit has the diverging unit. The diverging unit exerts the diverging action in the device array direction on the illumination light from the multiple arrayed light emitting devices. The illumination lights emitted from the respective light emitting devices are subjected to the diverging action in the device array direction, thereby being capable of adjusting the overlapping degree of the illumination lights emitted from the respective light emitting devices. More specifically, the diverging unit has one or more refractive surfaces having one main axis in a cross section including the device array direction. Since the illumination light from each of the light emitting devices is subjected to the diverging action based on a positional relationship between the light emitting device and corresponding one main axis, the overlapping degree of the illumination lights emitted from the respective light emitting devices can be adjusted according to the array interval of the respective light emitting devices.

Therefore, in the display light of the image formed according to the illumination by the illumination light on the image formation unit, the light quantity is restricted from being concentrated in a narrow range, and the display light easily spreads over a wide range. As described above, a decrease in the luminance of the virtual image when the occupant moves his head more largely can be restricted, and the visibility of the virtual image can be enhanced.

The image projection unit according to another configuration of the disclosure is used for the head-up display device, which is mounted on the movable object 1 and projects the display light of the image on the projection member 3 and reflects the display light from the projection member 3, to thereby display the virtual image of the image visible to the occupant. The image projection unit includes the light emitting device array 510 in which the multiple light emitting devices 510*a* emitting the illumination light are arrayed in the multiple device array directions ADx and ADy. The image projection unit further includes the image formation unit 550 that forms the image according to illumination by the illumination light and emits the image as the display light. The image projection unit further includes the optical member having the diverging units 570 and 670 which are located in the optical path between the light emitting device array and the image formation unit, and exerts the diverging action in at least one specific direction among the multiple device array directions on the illumination light from the respective light emitting devices. The diverging unit includes one or more refractive surfaces 572 and 672 that refract the illumination light while exerting the diverging action.

According to the above disclosure, the optical member which is located in the optical path between the light emitting device array and the image formation unit has the diverging unit. The diverging unit exerts the diverging action in the specific direction among the multiple device array directions on the illumination light from the multiple arrayed light emitting devices. The illumination light emitted from the respective light emitting devices is subjected to the diverging action in the specific direction, thereby being capable of adjusting the overlapping degree of the illumination lights emitted from the respective light emitting devices.

Therefore, in the display light of the image formed according to the illumination by the illumination light by the image formation unit, when the overlapping degree is adjusted so that the light quantity is restricted from being concentrated in the narrow range, the display light easily spreads over a wide range. As described above, the image projection unit is used for the HUD device, as a result of which a decrease in the luminance of the virtual image when the occupant moves his head more largely can be restricted, and the visibility of the virtual image can be enhanced.

The image projection unit according to another configuration of the disclosure is used for the head-up display device, which is mounted on the movable object 1 and projects the display light of the image on the projection member 3 and reflects the display light from the projection member 3, to thereby display the virtual image of the image visible to the occupant. The image projection unit includes the light emitting device array 10 in which the multiple light emitting devices 10*a* emitting the illumination light are arrayed in the device array direction AD. The image projection unit further includes the image formation unit 50 that forms the image according to illumination by the illumination light and emits the image as the display light. The image projection unit further includes the optical members 30, 230, 320, and 430 having the diverging units 70, 270, 370, and 470 which are located in the optical path between the light emitting device array and the image formation unit, and exerts the diverging action in the device array direction on the illumination light from the respective light emitting devices. The diverging unit includes one or more refractive surfaces 72, 272, 372, and 472 that refract the illumination light.

According to the above disclosure, the optical member which is located in the optical path between the light emitting device array and the image formation unit has the diverging unit. The diverging unit exerts the diverging action in the device array direction on the illumination light from the multiple arrayed light emitting devices. The illumination light emitted from the respective light emitting devices is subjected to the diverging action in the specific direction, thereby being capable of adjusting the overlapping degree of the illumination lights emitted from the respective light emitting devices.

Therefore, in the display light of the image formed according to the illumination by the illumination light by the image formation unit, when the overlapping degree is adjusted so that the light quantity is restricted from being concentrated in the narrow range, the display light easily spreads over a wide range. As described above, the image projection unit is used for the HUD device, as a result of which a decrease in the luminance of the virtual image when the occupant moves his head more largely can be restricted, and the visibility of the virtual image can be enhanced.

The present disclosure has been described based on the embodiments; however, it is understood that this disclosure is not limited to the embodiments or the structures. The present disclosure includes various modification examples and modifications within the equivalent range. In addition, it should be understood that various combinations or aspects, or other combinations or aspects, in which only one element, one or more elements, or one or less elements are added to the various combinations or aspects, also fall within the scope or technical idea of the present disclosure.

What is claimed is:

1. A head-up display device configured to be mounted on a movable object, the head-up display device configured to project a display light of an image on a projection member and to cause the projection member to reflect the display light to display a virtual image of the image to be visually recognizable by an occupant, the head-up display device comprising:
   a light emitting device array including a plurality of light emitting devices configured to emit illumination light and arrayed in a plurality of device array directions;
   an image formation unit configured to form the image according to illumination caused by the illumination light and to emit the image as the display light; and
   an optical member including a diverging unit, which is located in an optical path between the light emitting device array and the image formation unit, and configured to exert a diverging action in at least one specific direction among the plurality of device array directions on the illumination light from the respective light emitting devices, wherein
   the diverging unit includes one or more refractive surfaces configured to refract the illumination light while exerting the diverging action,
   the refractive surface is a single surface curved in a concave shape in the device array direction and configured to refract the illumination light collectively,
   the device array direction is one direction, and
   the single refractive surface is formed in a cylindrical surface shape curved in a concave shape in the device array direction.

2. The head-up display device according to claim 1, wherein the one or more refractive surfaces have one main axis in a cross section including the specific direction.

3. The head-up display device according to claim 1, further comprising:
   a light guide member having a condensing convex surface, which is opposed to the refractive surface and curved in a convex shape in the device array direction and configured to exert a condensing action on the illumination light, and
   at least a part of the condensing convex surface is located in a space defined by a concave curvature of the refractive surface.

4. The head-up display device according to claim 1, wherein
   the optical member further includes a plurality of condensing convex surfaces arrayed according to the number of light emitting devices in the device array direction and each curved in a convex shape in the device array direction to exert the individual condensing actions on the illumination light from the respective light emitting devices,
   the condensing convex surfaces are formed as a surface of the optical member on one side, and
   the diverging unit is formed as a surface of the optical member on an opposite side.

5. The head-up display device according to claim 1, further comprising:
   a condensing unit located in an optical path between the light emitting device array and the optical member and configured to exert a condensing action on the illumination light from the respective light emitting devices, wherein
   the diverging unit is configured to exert the diverging action on the illumination light, which is subjected to the condensing action by the condensing unit, immediately before illumination onto the image formation unit.

6. The head-up display device according to claim 1, further comprising:
   an individual light emission control unit configured to control the respective light emitting devices at individual light emission intensities.

7. The head-up display device according to claim 6, further comprising:
   an image generation unit configured to generate data of the image to be displayed on a display surface of the image formation unit, wherein
   a display divided region is defined by dividing the display surface by the number of light emitting devices arrayed in the device array direction, and
   the individual light emission control unit is configured to turn off the light emitting device corresponding to the display divided region in which the image by the image generation unit is not displayed among the respective light emitting devices.

8. The head-up display device according to claim 1, wherein
   the optical member forms a backlight optical system together with another light guide member, and
   the light emitting device array is located between a position of a principal point of the member, which is located farthest from the image formation unit, among the members of the backlight optical system and a position of a composite focal point of the backlight optical system.

9. A head-up display device configured to be mounted on a movable object, the head-up display device configured to project a display light of an image on a projection member and to cause the projection member to reflect the display light to display a virtual image of the image to be visually recognizable by an occupant, the head-up display device comprising:
- a light emitting device array including a plurality of light emitting devices configured to emit illumination light and arrayed in a plurality of device array directions;
- an image formation unit configured to form the image according to illumination caused by the illumination light and to emit the image as the display light;
- an optical member including a diverging unit, which is located in an optical path between the light emitting device array and the image formation unit, and configured to exert a diverging action in at least one specific direction among the plurality of device array directions on the illumination light from the respective light emitting devices;
- a first light guide member located in an optical path between the light emitting device array and the optical member and configured to guide the illumination light from the light emitting device array toward the optical member; and
- a second light guide member located in the optical path between the optical member and the image formation unit and configured to guide the illumination light from the optical member toward the image formation unit, wherein
- the diverging unit includes one or more refractive surfaces configured to refract the illumination light while exerting the diverging action,
- the refractive surface is a single surface curved in a concave shape in the device array direction and configured to refract the illumination light collectively,
- the optical member is formed in a concave lens shape and located between the first light guide member and the second light guide member, and
- the optical member includes a first abutment portion in an outer edge portion, which is in contact with the first light guide member on the side of the light emitting device array, and a second abutment portion in the outer edge portion, which is in contact with the second light guide member on the image formation unit side.

10. The head-up display device according to claim 9, wherein
- the single refractive surface is located to face at least one of the first light guide member and the second light guide member,
- the at least one of the first light guide member and the second light guide member includes a condensing convex surface opposed to the refractive surface and curved in a convex shape in the device array direction to exert a condensing action on the illumination light, and
- at least a part of the condensing convex surface is located in a space defined by a concave curvature of the refractive surface.

11. A head-up display device configured to be mounted on a movable object, the head-up display device configured to project a display light of an image on a projection member and to cause the projection member to reflect the display light to display a virtual image of the image to be visually recognizable by an occupant, the head-up display device comprising:
- a light emitting device array including a plurality of light emitting devices configured to emit illumination light and arrayed in a plurality of device array directions;
- an image formation unit configured to form the image according to illumination caused by the illumination light and to emit the image as the display light; and
- an optical member including a diverging unit, which is located in an optical path between the light emitting device array and the image formation unit, and configured to exert a diverging action in at least one specific direction among the plurality of device array directions on the illumination light from the respective light emitting devices, wherein
- the diverging unit includes one or more refractive surfaces configured to refract the illumination light while exerting the diverging action,
- the refractive surface includes a plurality of refractive surfaces, and
- the diverging unit is configured to exert the diverging action by causing the plurality of refractive surfaces aligned along the device array direction to cooperate with each other.

12. The head-up display device according to claim 11, wherein
- the optical member has the plurality of refractive surfaces in a concave Fresnel lens shape and configured to exert the diverging action by causing the plurality of refractive surfaces to cooperate with each other.

13. A head-up display device configured to be mounted on a movable object, the head-up display device configured to project a display light of an image on a projection member and to cause the projection member to reflect the display light to display a virtual image of the image to be visually recognizable by an occupant, the head-up display device comprising:
- a light emitting device array including a plurality of light emitting devices configured to emit illumination light and arrayed in a plurality of device array directions;
- an image formation unit configured to form the image according to illumination caused by the illumination light and to emit the image as the display light; and
- an optical member including a diverging unit, which is located in an optical path between the light emitting device array and the image formation unit, and configured to exert a diverging action in at least one specific direction among the plurality of device array directions on the illumination light from the respective light emitting devices, wherein
- the diverging unit includes one or more refractive surfaces configured to refract the illumination light while exerting the diverging action,
- the specific direction is one direction,
- the refractive surface includes a plurality of refractive surfaces, and
- the optical member has the plurality of refractive surfaces in a concave Fresnel lens shape, which is formed by dividing a virtual concave curved surface in a cylindrical surface shape in the specific direction, and configured to cooperate with each other to exert the diverging action.

14. A head-up display device configured to be mounted on a movable object, the head-up display device configured to project a display light of an image on a projection member and to cause the projection member to reflect the display light to display a virtual image of the image to be visually recognizable by an occupant, the head-up display device comprising:

a light emitting device array including a plurality of light emitting devices configured to emit illumination light and arrayed in a plurality of device array directions;

an image formation unit configured to form the image according to illumination caused by the illumination light and to emit the image as the display light; and an optical member including a diverging unit, which is located in an optical path between the light emitting device array and the image formation unit, and configured to exert a diverging action in at least one specific direction among the plurality of device array directions on the illumination light from the respective light emitting devices, wherein the diverging unit includes one or more refractive surfaces configured to refract the illumination light while exerting the diverging action, the device array direction and the specific direction are two directions, the refractive surface includes a plurality of refractive surfaces, and the optical member has the plurality of refractive surfaces in a concave Fresnel lens shape, which is formed by concentrically dividing a virtual concave curved surface in a spherical shape, and configured to cooperate with each other to exert the diverging action.

\* \* \* \* \*